United States Patent
Shimozono et al.

(10) Patent No.: US 8,347,060 B2
(45) Date of Patent: Jan. 1, 2013

(54) STORAGE SYSTEM, STORAGE EXTENT RELEASE METHOD AND STORAGE APPARATUS

(75) Inventors: Norio Shimozono, Machida (JP);
Kazuyoshi Serizawa, Tama (JP);
Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/293,526

(22) Filed: Nov. 10, 2011

(65) Prior Publication Data
US 2012/0054462 A1    Mar. 1, 2012

Related U.S. Application Data

(63) Continuation of application No. 12/505,188, filed on Jul. 17, 2009, now Pat. No. 8,069,331, which is a continuation of application No. 11/434,992, filed on May 15, 2006, now Pat. No. 7,574,577.

(30) Foreign Application Priority Data

Mar. 23, 2006    (JP) .................................. 2006-081051

(51) Int. Cl.
*G06F 12/02*    (2006.01)
(52) U.S. Cl. ........ 711/170; 711/112; 711/165; 711/171; 711/203; 718/104
(58) Field of Classification Search .................. 711/170, 711/112, 165, 171, 203; 718/104
See application file for complete search history.

(56) References Cited

U.S. PATENT DOCUMENTS

| | | | |
|---|---|---|---|
| 5,351,240 A * | 9/1994 | Highsmith | .................... 370/461 |
| 5,649,152 A | 7/1997 | Ohran et al. | |
| 5,790,852 A | 8/1998 | Salm | |
| 6,249,792 B1 | 6/2001 | Zwilling et al. | |
| 6,823,442 B1 | 11/2004 | Caneron | |
| 6,857,059 B2 | 2/2005 | Karpoff et al. | |
| 7,028,157 B2 * | 4/2006 | Block et al. | .................... 711/173 |
| 2004/0162958 A1 | 8/2004 | Kano et al. | |
| 2004/0215975 A1 * | 10/2004 | Dudfield et al. | .............. 713/201 |
| 2004/0260861 A1 | 12/2004 | Serizawa et al. | |
| 2006/0085471 A1 | 4/2006 | Rajan et al. | |
| 2007/0174673 A1 | 7/2007 | Kawaguchi et al. | |

FOREIGN PATENT DOCUMENTS

| | | |
|---|---|---|
| JP | 2005-050024 A | 2/2005 |
| JP | 2005-092308 A | 4/2005 |

OTHER PUBLICATIONS

"Volume management in SAN environment," Proceedings of the IEEE Eighth International Conference on Parallel and Distributed Systems (Jun. 2001).

* cited by examiner

*Primary Examiner* — Jae Yu
(74) *Attorney, Agent, or Firm* — Kilpatrick Townsend & Stockton LLP

(57) ABSTRACT

This storage system has an allocation unit for allocating a storage extent in prescribed units to the dynamic logical volume upon storing the data sent from the host computer in the dynamic logical volume; a management unit for managing the storage extent recognized as being currently used by the file system among the storage extents allocated to the dynamic logical volume by the allocation unit; and a release unit for releasing the storage extent that is not being managed by the management unit from the dynamic logical volume.

10 Claims, 25 Drawing Sheets

FIG.5

| LVOL ID | LVOL TYPE | PG ID | DVOL ID |
|---|---|---|---|
| L1 | SVOL | 0000 | - |
| L2 | DVOL | - | 0000 |
| L3 | DVOL | - | 0001 |
| LC | CVOL | - | - |

FIG.6

| DVOL ID | COMMAND PROCESSING MODE |
|---|---|
| 0000 | NORMAL MODE |
| 0001 | FLAG OPERATION MODE |
| 0002 | NORMAL MODE |

FIG.7

| PG ID | LBA START VALUE | ACCESS FLAG | ALLOCATION STATUS |
|---|---|---|---|
| 0001 | 0x00000000 | FALSE | ALLOCATED |
| 0001 | 0x00010000 | FALSE | ALLOCATED |
| 0001 | 0x00020000 | FALSE | ALLOCATED |
| : | : | : | : |
| 0002 | 0x00000000 | FALSE | ALLOCATED |
| 0002 | 0x00010000 | FALSE | ALLOCATED |
| 0002 | 0x00020000 | FALSE | ALLOCATED |
| : | : | : | : |
| 0003 | 0x00000000 | FALSE | ALLOCATED |
| 0003 | 0x00010000 | FALSE | UNUSED |
| 0003 | 0x00020000 | FALSE | UNUSED |
| : | : | : | : |

FIG.8

| DVOL ID | DVOL LBA START VALUE | LOCK FLAG | ALLOCATION STATUS | PG ID | PG LBA START VALUE |
|---|---|---|---|---|---|
| 0000 | 0x00000000 | TRUE | ALLOCATED | 0001 | 0x00010000 |
| 0000 | 0x00010000 | FALSE | ALLOCATED | 0002 | 0x00020000 |
| 0000 | 0x00020000 | FALSE | ALLOCATED | 0003 | 0x00000000 |
| : | : | : | : | : | : |
| 0001 | 0x00000000 | FALSE | ALLOCATED | 0001 | 0x00000000 |
| 0001 | 0x00010000 | FALSE | UNUSED | - | - |
| 0001 | 0x00020000 | TRUE | UNUSED | - | - |
| : | : | : | : | : | : |
| 0002 | 0x00000000 | FALSE | ALLOCATED | 0002 | 0x00010000 |
| 0002 | 0x00010000 | FALSE | UNUSED | - | - |
| 0002 | 0x00020000 | FALSE | UNUSED | - | - |
| : | : | : | : | : | : |

STORAGE SYSTEM, STORAGE EXTENT RELEASE METHOD AND STORAGE APPARATUS

CROSS-REFERENCE TO RELATED APPLICATION(S)

This application is a continuation application of U.S. patent application Ser. No. 12/505,188, filed on Jul. 17, 2009, which is a continuation application of U.S. patent application Ser. No. 11/434,992, filed on May 15, 2006, which claims priority from Japan Patent Application No. 2006-081051, filed on Mar. 23, 2006, the entire disclosure of which is incorporated herein by reference.

BACKGROUND OF THE INVENTION

The present invention can be suitably applied to a storage system including a storage apparatus for providing a dynamically capacity-extensible logical volume to a host computer.

In recent years, a storage apparatus for providing a data storage extent to a host computer can be equipped with a considerable number of large-capacity physical disks, and the storage capacity is being increased on a grand scale. With this kind of storage apparatus, foremost, a disk array configured from RAID (Redundant Array of Independent Disks) is created from physical disks, a plurality of physical storage resources are gathered to create a pool area, and a storage extent of a capacity requested by a host computer from the pool area is created as a logical volume and provided to the host computer.

Further in recent years, a storage apparatus has been proposed for dynamically extending the storage capacity by foremost providing a virtual logical volume to the host computer without creating a logical volume of a fixed capacity from the pool area, and dynamically allocating a storage extent in certain units from a pool area as a physical resource to such virtual logical volume according to a command from the host computer.

For instance, with the storage apparatus of Japanese Patent Laid-Open Publication No. 2003-015915 (Patent Document 1), a logical volume corresponding to the individual host computers is provided from a plurality of disk storage apparatuses, a logical block address subject to reading or writing is read based on a command to a logical volume sent from a host computer, a volume providing apparatus allocates a storage extent from an unused magnetic disk storage apparatus when a storage extent of the logical block address accessed by the command does not exist in the logical volume, the storage extent of the logical volume is dynamically extended, and the logical volume is reduced in an arbitrary amount based on the command of the application.

Further, the storage apparatus of Japanese Patent Laid-Open Publication No. 2005-011316 (Patent Document 2) has a storage controller connected to a host computer, and a plurality of storage apparatuses connected to the storage controller, wherein the storage controller issues a notice to the host computer to the effect that a virtual volume of a prescribed size has been allocated according to a command from the host computer, allocates the storage extent existing in the plurality of storage apparatuses to the virtual volume upon receiving from the host computer a command to the virtual volume, converting the command received from the host computer into a command addressed to the storage apparatus having the storage extent to which the virtual volume was allocated, and sending the converted command to this storage apparatus.

Nevertheless, with the storage apparatus of Patent Document 1, although it describes that the unnecessary storage extent arising as a result of reducing the size of the file system in the host computer is released from the volume, it does not describe releasing the unnecessary storage extent arising as a result of deleting data of files and the like that are written in the storage extent discontinuously from the volume, and it is possible that unnecessary storage extents will remain in the volume.

Further, with the storage apparatus of Patent Document 2, it describes releasing the unnecessary storage extent by the storage controller monitoring the commands and, upon updating the metadata of the file system pursuant to the deletion of data of files and the like described above, releasing the storage extent indicated by such metadata. Nevertheless, there is a problem in that the configuration of the storage controller will become complex since the storage controller needs to constantly monitor the file system and perform processing according to the file system in correspondence to a broad range of operation systems and file systems of the host computer.

SUMMARY

The present invention was devised in view of the foregoing problems, and an object thereof is to provide a storage system, storage extent release method and storage apparatus capable of efficiently operating a storage extent with a simple configuration.

In order to achieve the foregoing object, the present invention provides a storage system including a storage apparatus for providing a dynamically extensible dynamic logical volume, a host computer having a file system for inputting and outputting data to and from the dynamic logical volume, and a management server for managing the storage apparatus and the host computer, wherein the storage apparatus includes: an allocation unit for allocating a storage extent in prescribed units to the dynamic logical volume upon storing the data sent from the host computer in the dynamic logical volume; a management unit for managing the storage extent recognized as being currently used by the file system among the storage extents allocated to the dynamic logical volume by the allocation unit; and a release unit for releasing the storage extent that is not being managed by the management unit from the dynamic logical volume.

Therefore, the storage apparatus is able to dynamically release the unnecessary storage extent from the logical volume without having to understand the configuration of the file system.

Further, the present invention also provides a storage extent release method of a storage system including a storage apparatus for providing a dynamically extensible dynamic logical volume, a host computer having a file system for inputting and outputting data to and from the dynamic logical volume, and a management server for managing the storage apparatus and the host computer, including: a first step for allocating a storage extent in prescribed units to the dynamic logical volume upon storing the data sent from the host computer in the dynamic logical volume; a second step for managing the storage extent recognized as being currently used by the file system among the storage extents allocated to the dynamic logical volume at the first step; and a third step for releasing the storage extent that is not being managed at the second step from the dynamic logical volume.

Therefore, the storage apparatus is able to dynamically release the unnecessary storage extent from the logical volume without having to understand the configuration of the file system.

Moreover, the present invention also provides a storage apparatus for providing a dynamically extensible dynamic logical volume to data sent from a host computer, including: an allocation unit for allocating a storage extent in prescribed units to the dynamic logical volume upon storing the data sent from the host computer in the dynamic logical volume; a management unit for managing the storage extent recognized as being currently used by the file system among the storage extents allocated to the dynamic logical volume by the allocation unit; and a release unit for releasing the storage extent that is not being managed by the management unit from the dynamic logical volume.

Therefore, the storage apparatus is able to dynamically release the unnecessary storage extent from the logical volume without having to understand the configuration of the file system.

Moreover, the present invention also provides a storage system including a storage apparatus for providing a dynamically extensible dynamic logical volume, a host computer having a file system for inputting and outputting data to and from the dynamic logical volume, and a management server for managing the storage apparatus and the host computer, wherein the host computer includes a capacity utilization acquisition unit for acquiring the capacity utilization of the file system; wherein the storage apparatus includes a storage extent quantity acquisition unit for acquiring the number of the storage extents allocated to the dynamic logical volume corresponding to the file system; and wherein the management server includes a release decision unit for deciding the dynamic logical volume to release the storage extent based on the capacity utilization of the file system acquired by the capacity utilization acquisition unit and the number of the storage extents of the dynamic logical volume corresponding to the file system acquired by the storage extent quantity acquisition unit.

Therefore, it is possible to further release physical storage extents since the dynamic logical volume to release the storage extent can be decided to be a dynamic logical volume having an inferior utilization efficiency of the storage extent; that is, having a low capacity utilization of the file system in relation to the capacity utilization based on the number of storage extents of the dynamic logical volume.

According to the present invention, by allocating a storage extent in prescribed units to the dynamic logical volume upon storing the data sent from the host computer in the dynamic logical volume, managing the storage extent recognized as being currently used by the file system among the storage extents allocated to the dynamic logical volume by the allocation unit, and releasing the storage extent that is not being managed by the management unit from the dynamic logical volume, the storage apparatus is able to release the unnecessary storage extent from the dynamic logical volume without having to understand the configuration of the file system. As a result, it is possible to realize a storage system, storage extent release method and storage apparatus capable of efficiently operating the storage extent with a simple configuration.

Further, according to the present invention, by deciding the dynamic logical volume to release the storage extent based on the capacity utilization of the file system and the number of the storage extents of the dynamic logical volume corresponding to the file system, it is possible to further release physical storage extents since the dynamic logical volume to release the storage extent can be decided to be a dynamic logical volume having an inferior utilization efficiency of the storage extent; that is, having a low capacity utilization of the file system in relation to the capacity utilization based on the number of storage extents of the dynamic logical volume. As a result, it is possible to realize a storage system capable of efficiently operating the storage extent with a simple configuration.

DESCRIPTION OF DRAWINGS

FIG. 5 is a conceptual diagram for explaining the logical volume type management table;

FIG. 6 is a conceptual diagram for explaining the dynamic logical volume mode management table;

FIG. 7 is a conceptual diagram for explaining the pool management table;

FIG. 8 is a conceptual diagram for explaining the mapping table;

DETAILED DESCRIPTION

An embodiment of the present invention is now explained in detail with reference to the attached drawings.

(1) First Embodiment

(1-1) Configuration of Storage System in First Embodiment

Figure 1:
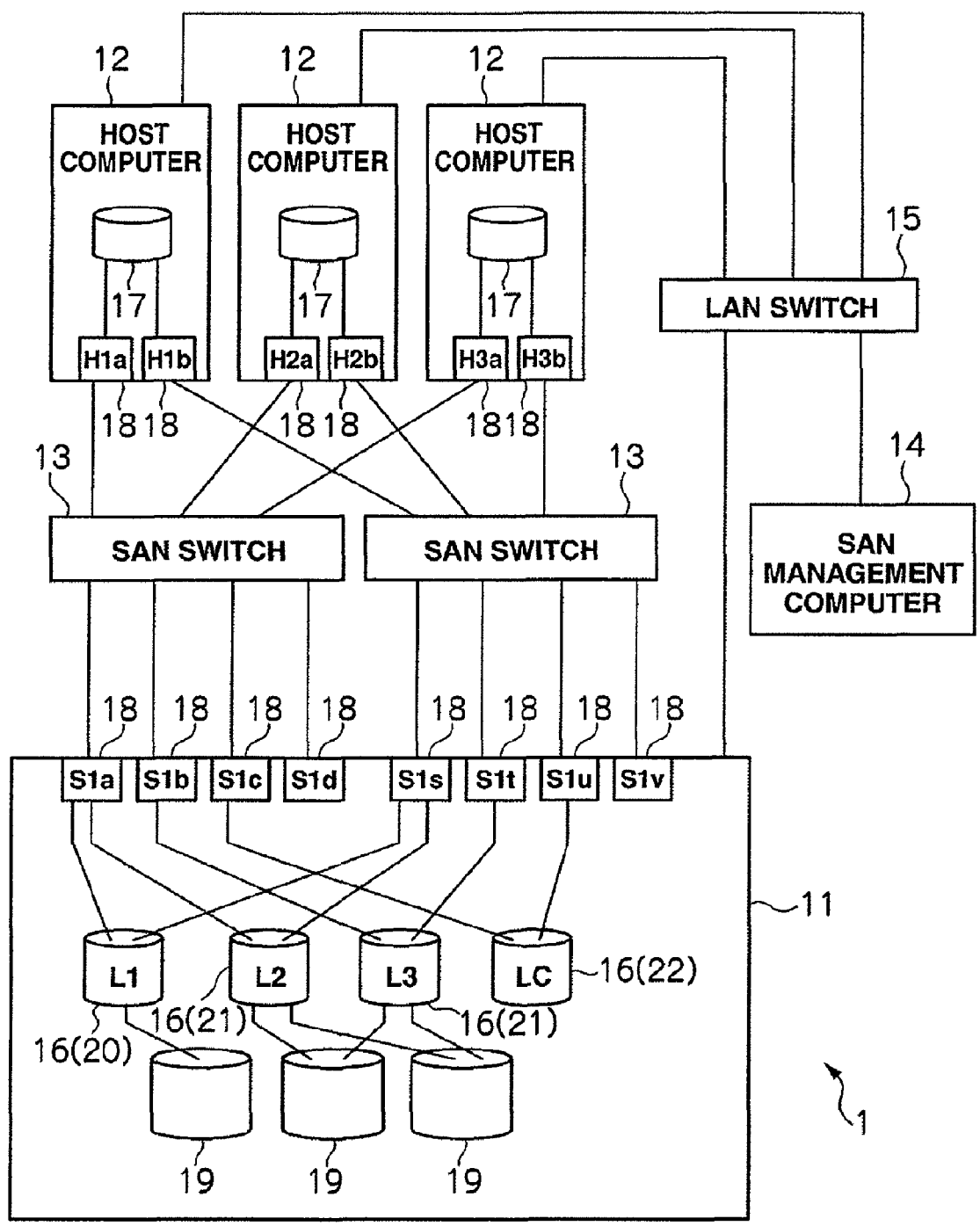
FIG. 1 is a schematic diagram showing the configuration of the storage system according to the first embodiment.

FIG. 1 is a configuration of the storage system 1 according to the first embodiment. As shown in FIG. 1, the storage system 1 has one or more storage apparatuses 11, one or more host computers 12 (hereinafter simply referred to as "hosts"), and a SAN (Storage Area Network) management computer 14 (hereinafter simply referred to as a "management server").

The storage apparatus 11 and host 12 have one or more SAN ports 18, and configure a SAN as a whole by connecting to a SAN switch 13. A SAN, for instance, is connected to an interface referred to as a fibre channel. Further, the storage apparatus 11 and host 12 use a protocol referred to as an FCP (Fibre Channel Protocol) to send and receive commands and data (the storage apparatus 11 and host 12 may be hereinafter collectively referred to as a "node").

Further, the storage apparatus 11, host 12, SAN switch 13 and management server 14 configure a LAN as a whole by being connected to a LAN (Local Area Network) switch 15.

Incidentally, in the present embodiment, there is no particular limitation in the type of interface and protocol of the SAN used between the storage apparatus 11 and host 12. For example, as the combination of an interface and protocol, a different combination such as the Ethernet (registered trademark)) and iSCSI (Internet Small Computer System Interface) may also be used. Further, although the storage apparatus 11 and management server 14 are connected via a LAN, this is merely an exemplification, and a different interface may be used.

The host 12 is a computer that executes some kind of application such as a database, and inputs and outputs data required for such processing to and from the storage apparatus 11.

The storage apparatus 11 is a system that provides one or more logical storage extents (hereinafter also referred to as "logical volumes" or "LVOLs") 16 to the host 12. When the host 12 sends a SCSI command to the storage apparatus 11, the storage apparatus 11 performs data transfer with the host 12 according to such command. Data transferred from the host 12 is stored in a parity group (hereinafter also referred to as a "PG") 19 configured from four hard disks among the hard disk group 105 (described later), which is a physical storage extent associated with the respective logical volumes 16.

Incidentally, the logical volume 16 can be broadly classified into a static logical volume (hereinafter also referred to as a "SVOL") 20 to which a physical storage extent is fixedly allocated from the parity group 19, a dynamic logical volume (hereinafter also referred to as a "DVOL") 21 to which a storage extent is dynamically allocated from the parity group 19, and a control logical volume (hereinafter also referred to as a "CVOL") 22 for storing control commands based on commands from the host 12 and mode change commands of the dynamic logical volume 21. Nevertheless, although the control logical volume 22 temporarily disposes data in the shared memory unit 102, it is not connected to the parity group 19 since it does not perform the reading and writing of data from and to the hard disk.

When the host 12 uses FCP, for instance, it designates the logical volume 16 by adding a port address for designating the SAN port 18 of the storage apparatus 1, and a LUN (Logical Unit Number) number to the command header and issuing the same to the storage apparatus 11. A command also contains information such as a command code for showing the command type such as reading and writing, and an address and transfer length showing the transfer start position in the logical volume 16.

When the storage apparatus 11 receives a SCSI command, it performs data transfer by specifying the SAN port 18 based on setting information and the logical volume 16 from the LUN. In the present embodiment, it is not necessarily the case that one or more logical volumes 16 must be set in each SAN port 18, and one or more unused SAN ports 18, to which the logical volume 16 has not been set, may be prepared at the time of initial configuration. FIG. 1 shows that S1$d$ and S1$v$ of the SAN port 18 are unused.

Incidentally, with the storage system 1, in order to increase the reliability of the SAN, as shown in FIG. 1, by using a plurality of SAN ports 18 and SAN switches 13 to connect the storage apparatus 11 and host 12 and associating the combination of the plurality of SAN ports 18 and LUN to the same logical volume 16, the access path from the host 12 to the logical volume 16 is made redundant.

In order to virtualize the redundant access path (combination of port address and LUN) to the logical volume 16, the host 12 manages the storage extent in units referred to as a host volume 17 (hereinafter referred to as a "HVOL"). When the application accesses the host volume 17, the host 12 sends to the storage apparatus 11 a SCSI command to the corresponding logical volume 16.

Figure 2:
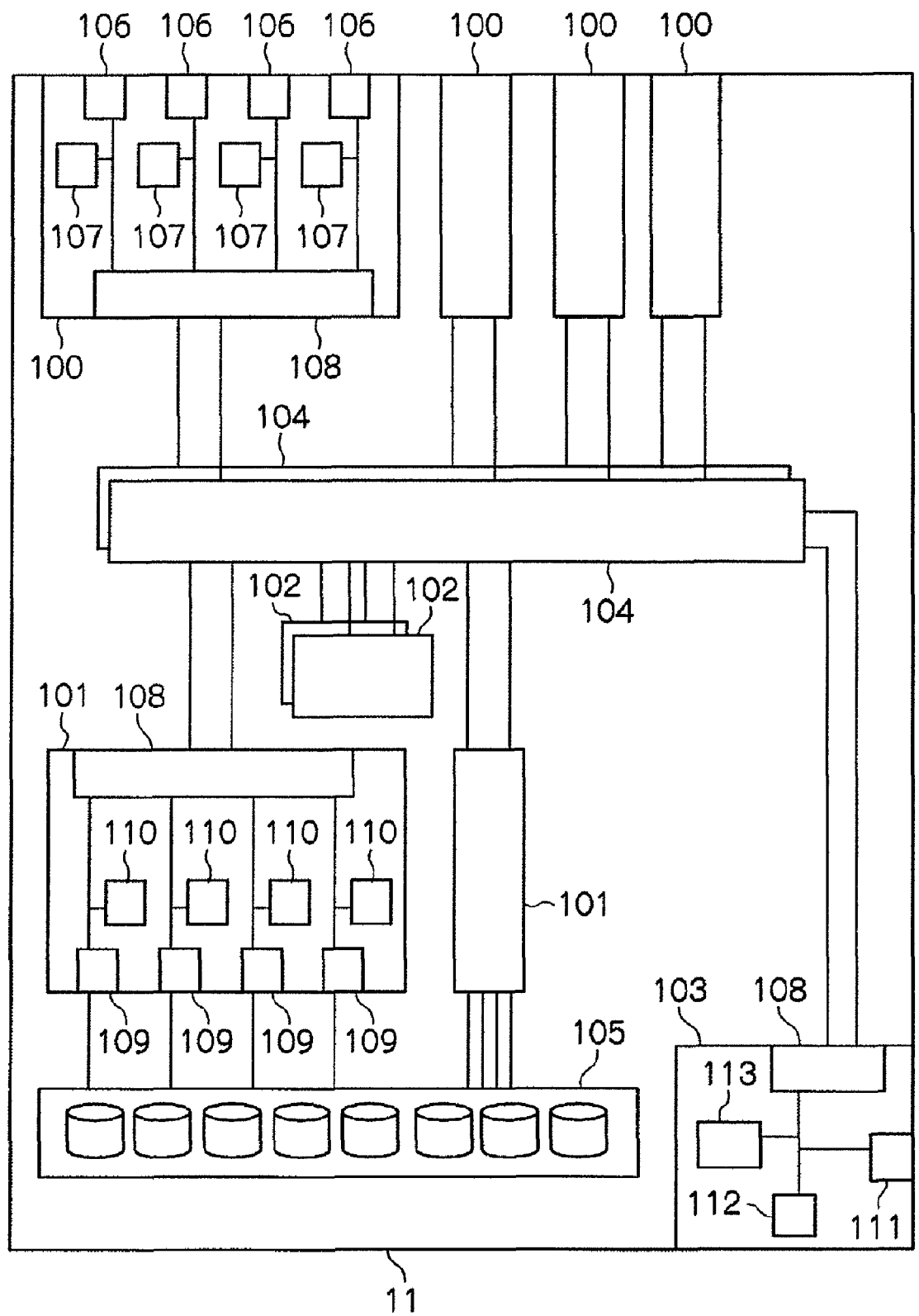
FIG. 2 is a schematic diagram showing the hardware configuration of the storage apparatus.

FIG. 2 is a hardware configuration of the storage apparatus 11. The storage apparatus 11 is configured from a plurality of host I/F units 100, a plurality of disk I/F units 101, a shared memory unit 102, a system management unit 103, and a switch unit 104 for connecting the foregoing components. The storage apparatus 11 is connected to the hard disk group 105 via the disk I/F unit 100. The hard disk group 105 is a portion for storing data of the logical volume 16, and is configured from a plurality of hard disks.

The host I/F unit 100 is a portion for connecting the storage apparatus 11 to the SAN switch 13, and is configured from a plurality of external I/Fs 106, a port processor 107, and a transfer control unit 108 for connecting the foregoing components to the switch unit 104. The external I/F 106 includes a SAN port 18 for connecting the storage apparatus 11 to a SAN, and controls the protocol of the SAN. The port processor 107 analyzes a SCSI command from the host 12, and performs the processing required for executing the SCSI command. The transfer control unit 108, by accessing the switch unit 104, controls the data transfer and communication between the external I/F 106 and port processor 107, and the shared memory unit 102, disk I/F unit 101 and system management unit 103.

The disk I/F unit 101 is a portion for connecting the storage apparatus 11 and hard disk group 105, and is configured from a disk I/F 109, a disk processor 110, and a transfer control unit 108 for connecting the foregoing components to the switch unit 104. The disk I/F 101 connects the storage apparatus 11 to the hard disk group 105, and controls the protocol between the hard disk group 105. The disk processor 110 communicates with the port processor 107 and controls the data transfer between the hard disk group 105 and shared memory 102 required for the processing of the SCSI command.

The system management unit 103 is a portion for connecting the storage apparatus 11 to the LAN switch 15, and is configured from a management I/F 111, a management processor 112, a nonvolitile memory 113 and a transfer control unit 108. The management I/F 111 connects the storage apparatus 11 to the LAN switch 15, and controls the protocol of the LAN. For example, this is an NIC (Network Interface Card) of the Ethernet (registered trademark). The management processor 112 communicates with the management server 14, and executes the setting of the storage apparatus 11. The nonvolitile memory 113 retains the setting information of the storage apparatus 11.

Incidentally, the hardware configuration of the storage apparatus 11 in the present embodiment is an exemplification, and is not limited to the foregoing configuration so as long as it is capable of providing a plurality of SAN ports 18 and a plurality of logical volumes 16.

Figure 3:
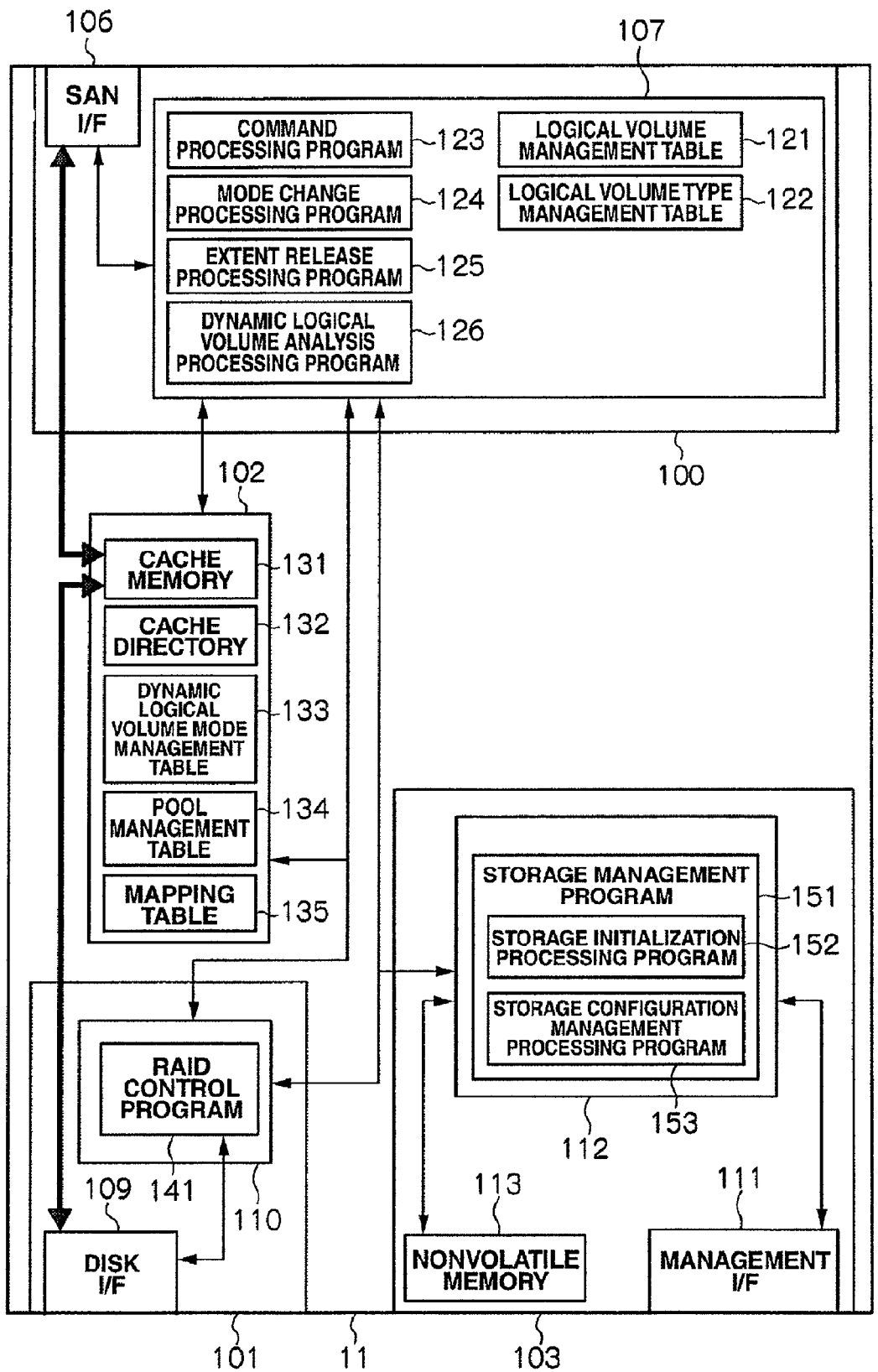
FIG. 3 is a schematic diagram showing the software configuration of the storage apparatus.

FIG. 3 is a software configuration of the storage apparatus 11. Foremost, the processing to be executed in the respective portions and the retained data and tables are explained. The port processor 107 retains a logical volume management table 121 (FIG. 4) and a logical volume type management table 122 (FIG. 5), and executes a command processing program 123, a mode change processing program 124, an extent release processing program 125 and a dynamic logical volume analysis processing program 126. Incidentally, the command processing program 123, mode change processing program 124, extent release processing program 125 and dynamic logical volume analysis processing program 126 will be described later.

The shared memory unit 102 retains a cache data 131 for storing a part of the data of the logical volume 16, a cache directory 132 for associating the cache data 131 and the internal position of the logical volume 16, a dynamic logical volume mode management table 133 (FIG. 6), a pool management table 134 (FIG. 7) and a mapping table 135 (FIG. 8).

The disk processor 110 executes a RAID control program 141. The RAID control program 141 is a program that is activated with a command from the port processor 107, issues a command to the hard disk group 105, and executes data transfer with the shared memory unit 102. Further, the RAID control program 141 performs RAID (Redundant Array of Inexpensive Disks) processing with a plurality of hard disks of the hard disk group 105. Specifically, the RAID control program 141 manages the association of the address space in the logical volume 16 and the address space of the hard disk group 105, and accesses the appropriate hard disk.

The management processor 112 executes a storage management program 151. The storage management program 151 contains a storage initialization processing program 152 for initializing the storage apparatus 11, and a storage configuration management processing program 153 for acquiring or changing the configuration information of the storage apparatus 11 according to a request from the management server 14.

Initialization processing of the storage apparatus 11 is now explained. When the storage apparatus 11 is activated, the management processor 112 activates the storage initialization processing program 152 of the storage management program 151 and executes storage initialization processing. In the storage initialization processing program 152, the management processor 112 reads the setting information from the nonvolitile memory 113, sets the logical volume management table 121 and logical volume type management table 122 in the port processor 107, and respectively loads the command processing program 123 in the port processor 107 and loads the RAID control program 141 in the disk processor 110.

When the command processing program 123 is activated, the port processor 107 initializes the external I/F 106 and cache directory 132, and enters a state of waiting for a SCSI command from the host 12. When the RAID control program 141 is activated, the disk processor 110 initializes the disk I/F 109, confirms that it is possible to access the hard disk group 105, enters a state of waiting for a command from the port processor 107, and the initialization processing is completed thereby.

Next, configuration management processing of the storage apparatus 11 is explained. When the management processor 112 receives from the management I/F 111 a prescribed request from the management server 14, it executes the storage configuration management processing.

In the storage configuration management processing program 153, the management processor 112 foremost determines the type of request from the management server 14. If this request is to acquire the configuration information, the management processor 112 acquires the logical volume management table 121, logical volume type management table 122, dynamic logical volume mode management table 133, pool management table 134 or mapping table 135 designated by the request from the port processor 107 or shared memory unit 102, and sends this to the management server 14 via the management I/F 111.

If the request is to change the configuration information, the management processor 112 changes the logical volume management table 121, logical volume type management table 122, dynamic logical volume mode change table 133, pool management table 134 or mapping table 135 designated by the request in the port processor 107 and nonvolitile memory 113, and reports the completion of execution to the management server 14 via the management I/F 111.

Next, the flow of the storage apparatus 11 executing the SCSI command from the host 12 is explained. When the external I/F 106 receives a SCSI command from the host 12, it notifies the contents of the SCSI command to the port processor 107. The port processor 107 is periodically polling the notification from the external I/F 106, and, when it detects the notification of a SCSI command, it executes the command processing program 123. Incidentally, here, the outline of the command processing program 123 is explained, and the detailed processing pertaining to the present invention will be described later with reference to FIG. 13 and FIG. 14.

In the command processing program 123, the port processor 107 foremost decides the logical volume 16 of the access target from the logical volume management table 121 based on the LUN designated by the SCSI command. Further, the port processor 107 accesses the cache directory 132 of the shared memory unit 102 to determine the hit/miss. Then, when the data requested by the host 12 is a cache hit, the port processor 107 commands the external I/F 106 to perform the data transfer between the cache data 131 and host 12.

Contrarily, when the result is a cache miss, the port processor 107 performs the following processing. In the case of a read command, the port processor 107 commands the disk processor 110 to perform the data transfer between the hard disk group 105 and cache data 131, updates the cache directory 132 after the completion of such data transfer, and commands the external I/F 106 to transfer data to the host 12. In the case of a write command, the port processor 107 accesses the cache directory 132 and secures the unused extent of the cache data 131. Then, the port processor 107 commands external I/F 106 to perform the data transfer between the secured cache data 131 and host 12, and updates the cache directory 132 after the completion of such data transfer.

The port processor 107 periodically commands the disk processor 110 to perform data transfer between the hard disk group 105 and cache data 131, and writes the dirty write data registered in the cache directory 132 into the hard disk group 105.

Like this, the storage apparatus 11 executes the SCSI command from the host 12. Nevertheless, this processing flow is merely an exemplification, and there is no particular limitation in this processing flow so as long as it is possible to determine the logical volume 16 based on the LUN and setting information of the SCSI command, and thereby perform the data transfer.

Figure 4:
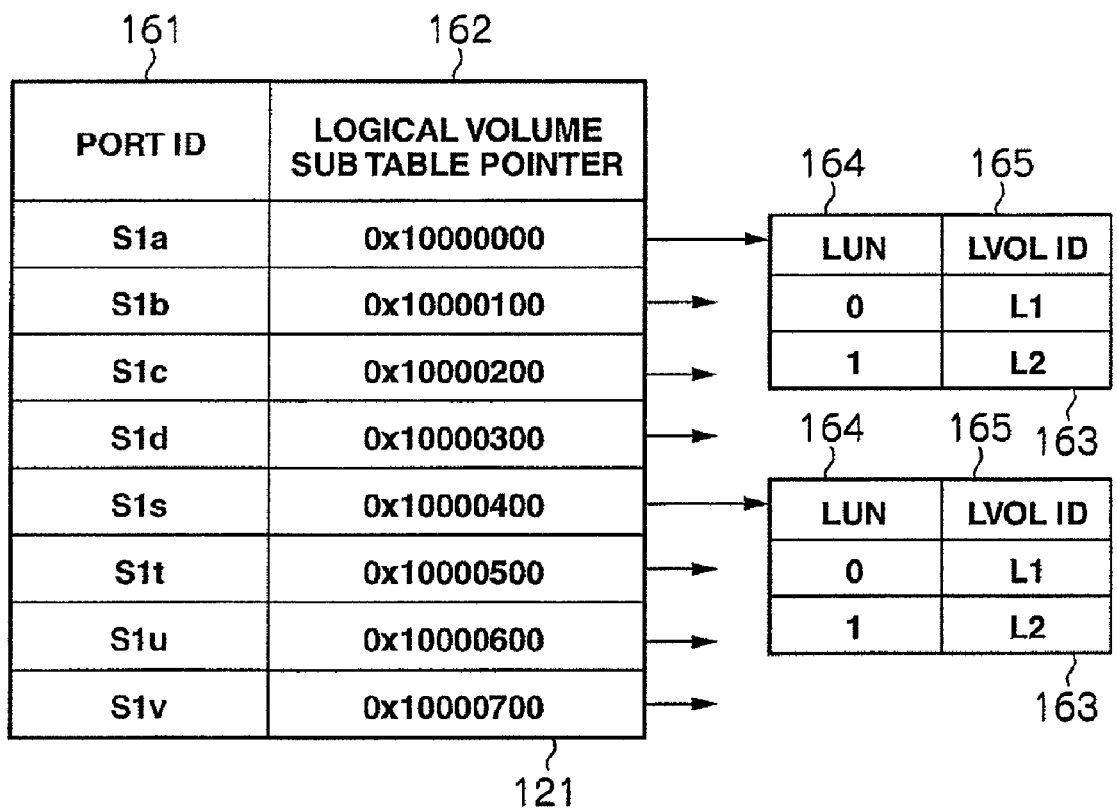
FIG. 4 is a conceptual diagram for explaining the logical volume management table.

FIG. 4 is a diagram showing the configuration of the logical volume management table 121. The logical volume management table 121 is a table retaining the correspondence of the respective SAN ports 18 and logical volume 16, and is configured from a plurality of entries corresponding to the SAN port 18 of the storage apparatus 11.

The respective entries of the logical volume management table 121 are configured from a port ID management column 161 for managing the ID of the SAN port 18, and a logical volume management subtable pointer 162 for retaining the association of the ID of the SAN port 18 and the logical volume management subtable 163.

The logical volume management subtable 163 is a table for retaining the correspondence of the LUN of each SAN port 18 and the logical volume 16, and each entry is configured from a LUN management column 164 for managing the LUN of the SAN port 18, and a LVOL ID management column 165 for managing the logical volume 16 corresponding to the LUN management column 164.

Here, for example, the LUN "0" of the SAN port 18, which is the port ID "S1a", is associated with the logical volume 16 of the LVOL ID "L1", and the LUN "1" of the SAN port 18, which is the ID "S1a", is associated with the logical volume 16 of the LVOL ID "L2".

FIG. 5 is a diagram showing the configuration of the logical volume type management table 122. The logical volume type management table 122 is configured from a plurality of entries corresponding to the logical volume 16 of the storage apparatus 11.

Each entry of the logical volume type management table 122 is configured from a LVOL ID management column 171 for managing the ID of the logical volume 16, a LVOL type management column 172 for managing the type of the logical volume 16, a PG ID 173 for managing the ID of the parity group corresponding to the static logical volume 20 when the logical volume 16 is such static logical volume 20, and a DVOL ID 174 for managing the ID of the dynamic logical volume 21 when the logical volume 16 is such dynamic logical volume 21.

Here, for example, the logical volume 16 of the LVOL ID "L1" is the static logical volume 20 and is associated with the parity group 19 of the PG ID "0000", and the logical volume 16 of the LVOL ID "L2" is the dynamic logical volume 21 and is associated with the dynamic logical volume 21 of the DVOL ID "0000".

FIG. 6 is a diagram showing the configuration of the dynamic logical volume mode management table 133. Each dynamic logical volume mode management table 133 is configured from a plurality of entries corresponding to the dynamic logical volume 21 of the storage apparatus 11.

Each entry of the dynamic logical volume mode management table 133 is configured from a DVOL ID management column 181 for managing the ID of the dynamic logical volume 21, and a command processing mode management column 182 for managing the processing mode of a SCSI command from the host 12 of the dynamic logical volume 21.

Here, for instance, the dynamic logical volume 21 of the DVOL ID "0000" is in a normal mode, and the dynamic logical volume 21 of the DVOL ID "0001" is in a flag operation mode.

Incidentally, a normal mode is a mode for normally executing the SCSI command from the host, and, as described in detail later, a flag operation mode is a mode for changing to "TRUE" the access flag management column of the extent representing the allocation unit for allocating the physical storage extent to the dynamic logical volume 21 according to the SCSI command from the host 12.

FIG. 7 is a diagram showing the configuration of the pool management table 134. Each pool management table 134 is configured from a plurality of entries corresponding to the parity group 19 of the storage apparatus 11. Incidentally, each line of the pool management table 134 corresponds to each extent.

Each entry of the pool management table 134 is configured from a PG ID management column 191 for managing the ID of the parity group 19, an LBA start value management column 192 for managing the start value of the LBA (Logical Brock Address) of the parity group 19, an access flag management column 193, and an allocation status management column 194.

The access flag management column 193, during the flag operation mode described above, manages whether to turn "ON" or "OFF" the access flag representing that the physical storage extent storing the data designated by the SCSI command has been accessed according to the SCSI command from the host 12.

Here, the access flag management column 193 manages the access flag management column 193 based on "FALSE" or "TRUE", and it is "OFF" when the access flag management column 193 is "FALSE", which shows that the physical storage extent storing the data designated by the SCSI command from the host 12 has not been accessed. Meanwhile, when the access flag management column 193 is "ON" when it is "TRUE", and shows that the physical storage extent storing the data designated by the SCSI command from the host 12 has been accessed.

The allocation status management column 194 manages whether the physical storage extent has been allocated to any dynamic logical volume 21 regarding the respective extents.

Here, the allocation status management column 194 manages the allocation status based on "Allocated" or "Unused", and, when the allocation status is "Allocated", this shows that the physical storage extent is allocated to any one of the dynamic logical volumes 21. When the allocation status is "Unused", this shows that the physical storage extent is not allocated to any dynamic logical volume 21.

Here, for example, with the physical storage extent corresponding to the LBA start value "0x00000000" of the parity group 19, which is the PG ID "0001", since the access flag management column 193 is "FALSE", during the flag operation mode, the physical storage extent storing the data designated by the SCSI command has not been accessed, and, since the allocation status is "Allocated", it is allocated to any one of the dynamic logical volumes 21.

FIG. 8 is a diagram showing the configuration of the mapping table 135. The mapping table 135 is a table for retaining the correspondence of the dynamic logical volume 21 and the physical storage extent of the parity group 19, and is configured from a plurality of entries corresponding to the dynamic logical volume 21 of the storage apparatus 11. Incidentally, each line of the mapping table 135 corresponds to each extent.

Each entry of the mapping table 135 is configured from a DVOL ID management column 201 for managing the ID of the dynamic logical volume 21, a DVOL LBA start value management column 202 for managing the start value of the LBA of the dynamic logical volume 21, a lock flag management column 203, an allocation status management column 204, a PG ID management column 205 for managing the ID of the parity group 19, and a PG LBA start value management column 206 for managing the start value of the LBA of the parity group 19.

The lock flag management column 203 manages whether to prohibit the reading or writing of data based on the SCSI command from the host 12 upon allocating a physical storage extent of the parity group 19 to the dynamic logical volume 2, or upon deleting a physical storage extent of the parity group 19 from the dynamic logical volume 21.

Further, the lock flag management column 203 simultaneously manages whether to prohibit the allocation of a physical storage extent of the parity group 19 to the dynamic logical volume 21 or the deletion of a physical storage extent of the parity group 19 from the dynamic logical volume 21 upon reading or writing data based on the SCSI command from the host 12.

Here, the lock flag management column 203 manages the lock flag management column 203 based on "FALSE" or "TRUE", and, when the lock flag management column 203 is "FALSE", this shows that the reading and writing of data based on the SCSI command from the host 12 is not prohibited, and further shows that the allocation of a physical storage extent of the parity group 19 to the dynamic logical volume 21 or the deletion of a physical storage extent of the parity group 19 from the dynamic logical volume 21 is not prohibited.

Further, when the lock flag management column 203 is "TRUE", this shows that the reading and writing of data based on the SCSI command from the host 12 is prohibited, and further shows that the allocation of a physical storage extent of the parity group 19 to the dynamic logical volume 21 or the deletion of a physical storage extent of the parity group 19 from the dynamic logical volume 21 is prohibited.

The allocation status management column 204 manages whether a physical storage extent of the parity group 19 is allocated to each extent.

Here, the allocation status management column 204 manages the allocation status based on "Allocated" or "Unused", and, when the allocation status is "Allocated", this shows that a physical storage extent of the parity group 19 is allocated to the dynamic logical volume 21, and, when the allocation status is "Unused", this shows that a physical storage extent of the parity group 19 is not allocated to the dynamic logical volume 21. Incidentally, if the allocation status is "Unused", since a physical storage extent of the parity group 19 is allocated, the allocation status management column 204 manages the PG ID management column 205 and PG LBA start value management column 206 based on "–".

Here, for instance, a physical storage extent corresponding to the LBA start value "0x00010000" of the parity group 19, which is the PG ID "0000", is allocated to the logical storage extent corresponding to the LBA start value "0x00000000" of the dynamic logical volume 21, which is the DVOL ID "0000", and, since the lock flag management column 203 is "TRUE", reading and writing of data based on the SCSI command from the host 12 is prohibited, or the allocation of a physical storage extent of the parity group 19 to the dynamic logical volume 21 or the deletion of a physical storage extent of the parity group 19 from the dynamic logical volume 21 is prohibited.

Figure 9:
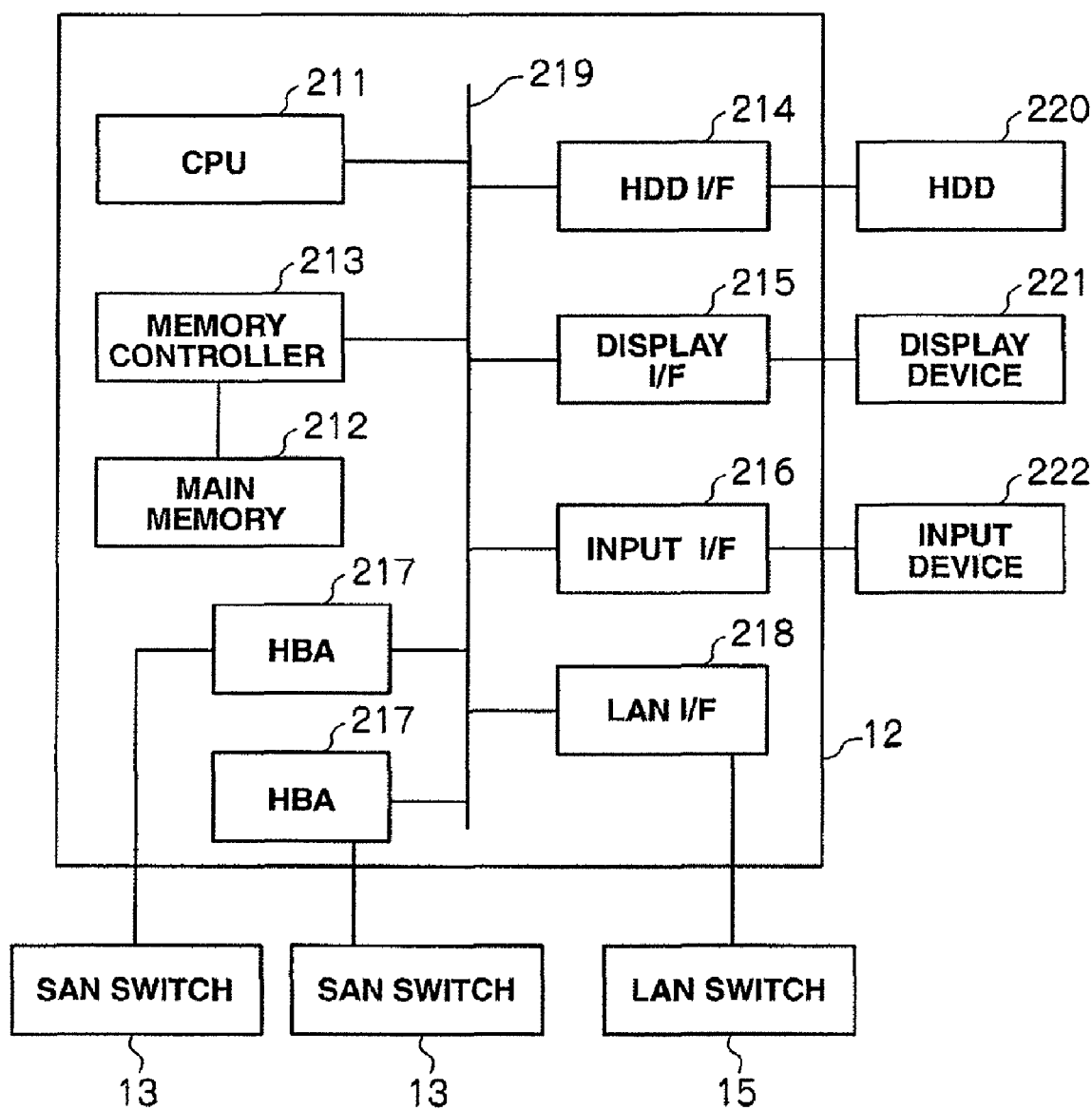
FIG. 9 is a schematic diagram showing the hardware configuration of the host.

FIG. 9 is a hardware configuration of the host 12. The host 12 is configured from a CPU 211, a main memory 212, a memory controller 213 for controlling the main memory 212, a HDD (Hard Disk Drive) I/F 214, a display I/F 215, an input I/F 216, one or more HBAs (Host Bus Adapters) 217, a network I/F 218, and a bus 219 for connecting the foregoing components.

The CPU 211 executes the respective programs described later, and the main memory 212 retains data required for executing such programs. The memory controller 213 controls the main memory 212, and is a portion for connecting to the bus 219. The HDD I/F 214 is a portion for connecting the bus 219 and HDD 220. The display I/F 215 is a portion for connecting the bus 219 and display device 221. The input I/F 216 is a portion for connecting the bus 219 and input device 222 such as a keyboard or mouse. The HBA 217 includes the SAN port 18, and is a portion for connecting the bus 219 and SAN switch 13. The network I/F 218 is a portion for connecting the bus 219 and LAN switch 15.

Incidentally, the foregoing hardware configuration is merely an exemplification, and there is no particular limitation in the hardware configuration so as long as it has one or more SAN port 18 ports and an interface to the LAN switch 15, and is capable of executing the software described later.

Figure 10:
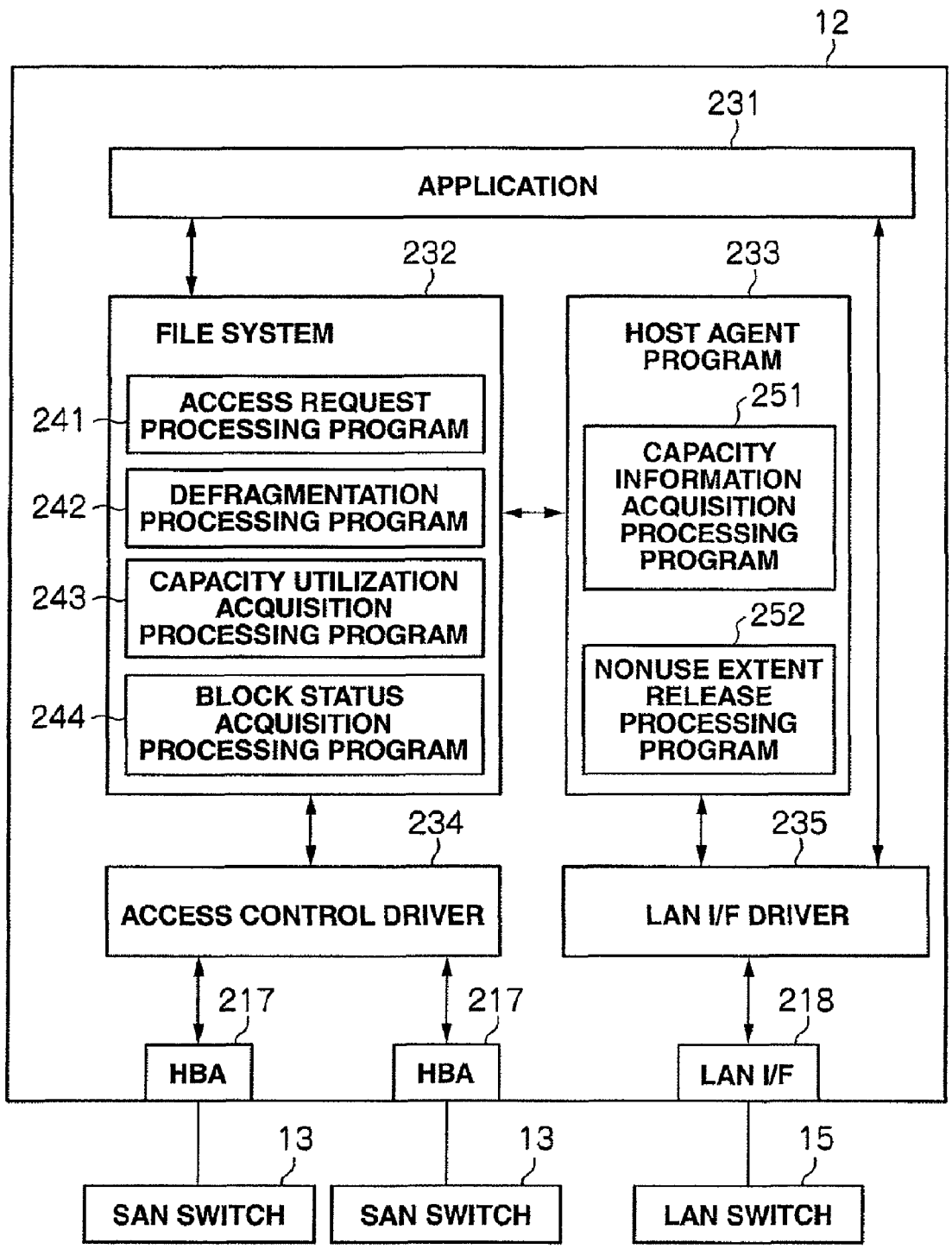
FIG. 10 is a schematic diagram showing the software configuration of the host according to the first embodiment.

FIG. 10 is a software configuration of the host 12. Foremost, processing to be executed by the CPU 211 of the host 12, and data and tables retained by the main memory 212 are explained. The CPU 211 of the host 12 executes an application 231, a file system 232, a host agent program 233, an access control driver 234, and a LAN I/F driver 235. The access control driver 234 is a driver for controlling the transfer of data and commands with the SAN switch 13. The LAN I/F driver 235 is a driver for controlling the transfer of data and commands with the LAN switch 15.

The file system 232 includes an access request processing program 241, a defragmentation processing program 242, a capacity utilization acquisition processing program 243 and a block status acquisition processing program 244. The access request processing program 241 is a program for executing the access request processing to the host volume 17. The defragmentation processing program 242 is a program for executing the defragmentation processing of the host volume 17. Incidentally, the capacity utilization acquisition processing program 243 and block status acquisition processing program 244 will be described later.

The host agent program 233 includes a capacity information acquisition processing program 251 and a nonuse extent release processing program 252. Incidentally, the capacity information acquisition processing program 251 and nonuse extent release processing program 252 will be described later.

Incidentally, the data and tables to be used by the respective programs described above are retained in the main memory 212.

The processing flow of the access request from the application 231 to the host volume 17 is now explained. The application 231 is a program to be executed by the host 12 and, for instance, is a database or the like. The application 231 calls the access request processing program 241 of the file system 232, and requests the access to the host volume 17. The access request processing program 241 is a program for converting the access to the file requested by the application 231 into an access to the host volume 17.

In the access request processing program 241, the CPU 211 executes the access request to the host 17 received from the application 231 or file system 232. Specifically, the CPU 211 decides the access path to the logical volume 16; in particular the port address and LUN of the storage apparatus 11 based on a table of the access request processing program 241 retained in the main memory 212, issues a SCSI command to the storage apparatus 11 via the HBA 217, and thereby accesses the logical volume 16. When the data transfer with the storage apparatus 11 is complete, the CPU 211 notifies the completion of access to the application 231 or file system 232.

Incidentally, the foregoing access request processing flow is merely an exemplification, and there is no particular limitation in the processing flow so as long as it decides the access path from the access request to the host volume 17 based on the setting information, and access the logical volume 16 of the storage apparatus 11.

Figure 11:
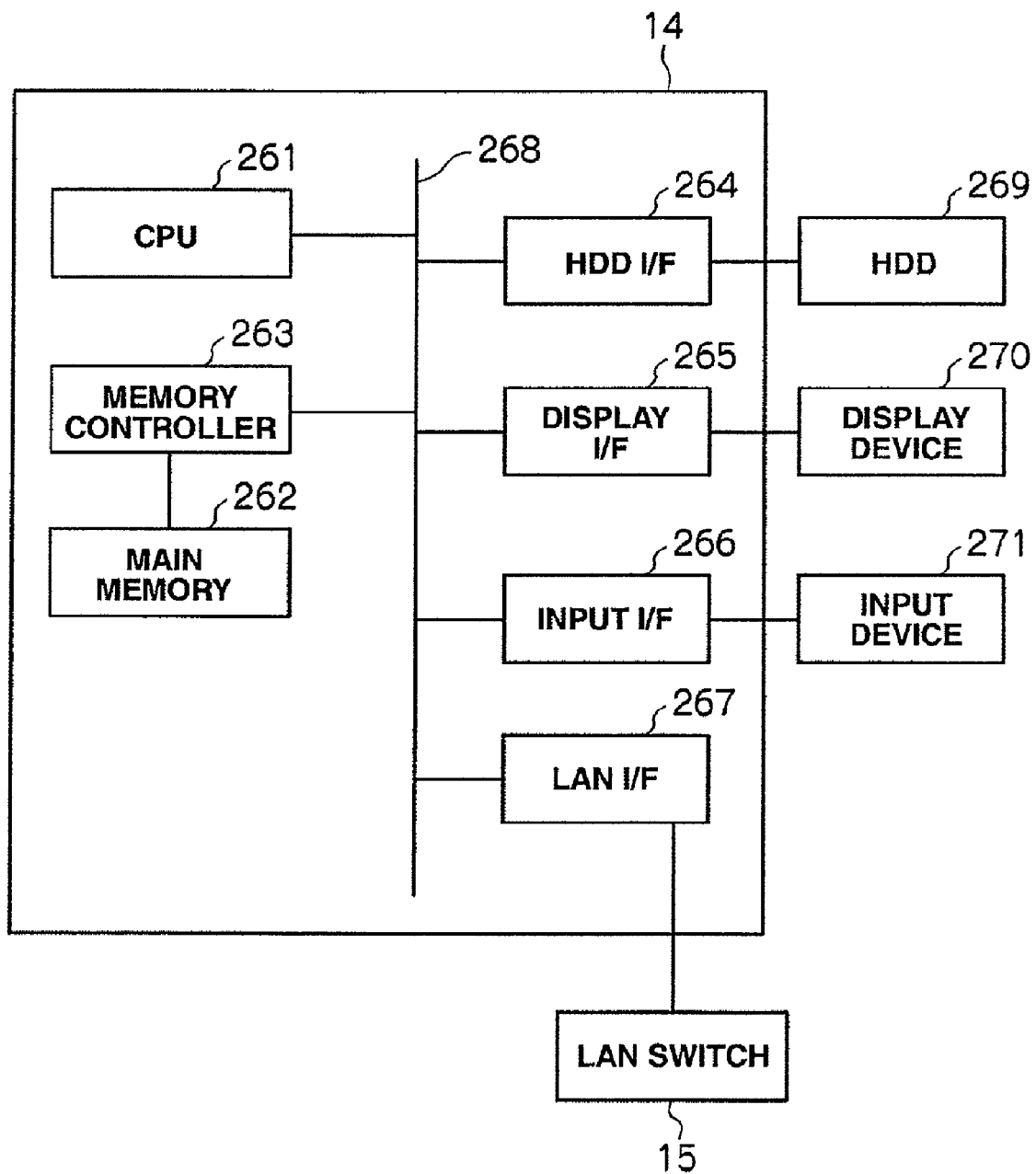
FIG. 11 is a schematic diagram showing the hardware configuration of the management server.

FIG. 11 is a hardware configuration of the management server 14. The management server 14 is configured from a CPU 261, a memory 262, a memory controller 263 for controlling the memory 262, a HDD I/F 264, a display I/F 265, an input I/F 266, a LAN I/F 267, and a bus 268 for connecting the foregoing components.

The CPU 261 executes a SAN configuration management program 281 described later, and the memory 262 retains data required for such execution. The memory controller 263 controls the memory 262, and is a portion for connecting to the bus 268. The HDD I/F 264 is a portion for connecting the bus 268 and HDD 269. The display I/F 265 is a portion for connecting the bus 268 and display device 270. The input I/F 266 is a portion for connecging the bus 268 and the input device 271 such as a keyboard or mouse. The LAN I/F 267 is a portion for connecting the bus 268 and LAN switch 15.

Incidentally, the foregoing hardware configuration is merely an exemplification, and there is no particular limitation in the hardware configuration so as long as it has an interface for connecting to the LAN switch 15, and is capable of executing the software described later.

Figure 12:
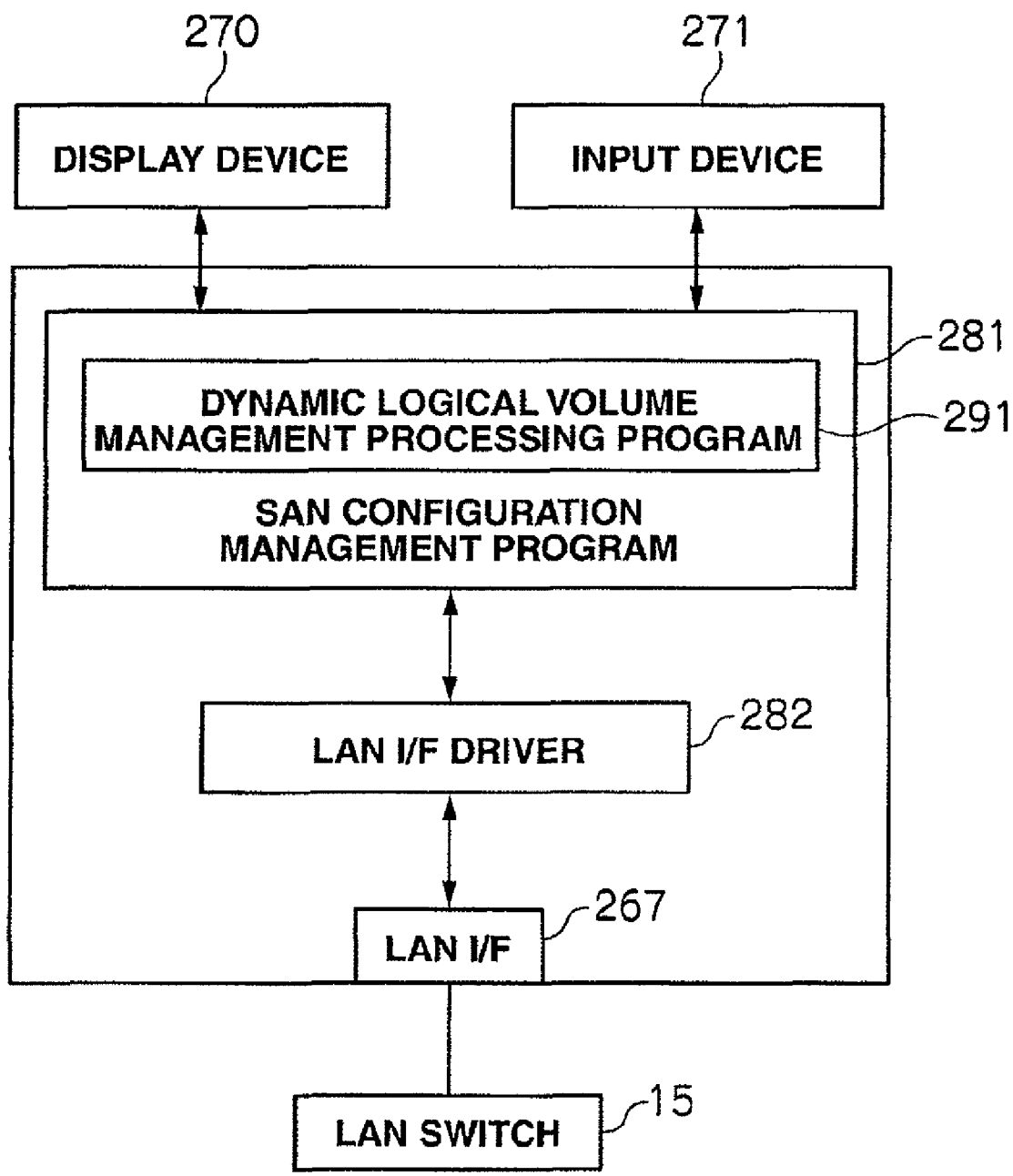
FIG. 12 is a schematic diagram showing the software configuration of the management server.

FIG. 12 is a software configuration of the management server 14. Foremost, the processing to the executed by the CPU 261 of the management server 14 and data retain by the memory 262 are explained. The CPU 261 of the management server 14 executes a SAN configuration management program 281 and a LAN I/F driver 282.

The SAN management program 240 includes a dynamic logical volume management processing program 291. Incidentally, the dynamic logical volume management processing program 291 will be described later.

(1-2) Command Processing in First Embodiment

Figure 13:
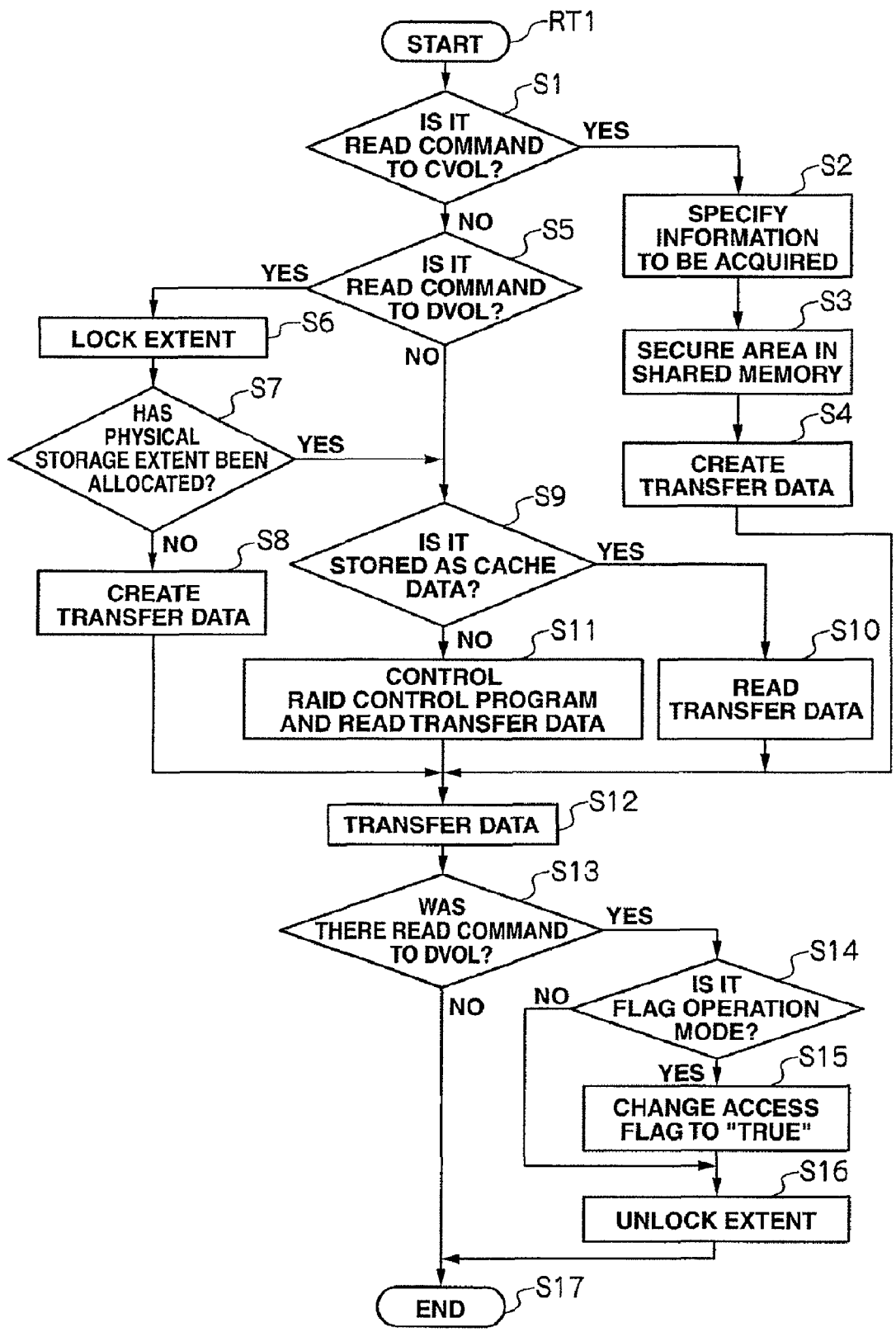
FIG. 13 is a flowchart for explaining the command processing at the time of reading data.

Next, the command processing of the storage system 1 in the first embodiment is explained. FIG. 13 is a flowchart showing the specific processing routine of the storage apparatus 11 concerning the command processing during the reading of data in the storage system 1.

When the port processor 107 initially receives a SCSI command from the host 12 according to the command processing routine RT1 during the reading of data shown in FIG. 13 by executing the command processing program 123, which is a program for executing the SCSI command received from the host 12, it checks whether the SCSI command is a read command to the control logical volume 22 (S1).

And, when the SCSI command is a read command to the control logical volume 22 (S1: YES), the port processor 107 specifies the information to be acquired to be sent to the host 12 based on the read command (S2).

Next, the port processor 107 secures an area for storing the information to be acquired in the shared memory unit 102 (S3). Next, the port processor 107 creates transfer data to be sent to the host 12 from the information to be acquired that is stored in the shared memory unit 102 (S4).

Contrarily, when the SCSI command is not a read command to the control logical volume 22 (S1: NO), the port processor 107 checks whether the SCSI command received from the host 12 is a read command to the dynamic logical volume 21 (S5).

And, when the SCSI command is a read command to the dynamic logical volume 21 (S5: YES), the port processor 107 refers to the mapping table 135 and changes the lock flag management column 203 of the corresponding extent to "TRUE", and thereby locks the corresponding extent so as to prohibit the reading and writing of data based on the SCSI command from the host 12, and prohibit the allocation of a physical storage extent of the parity group 19 to the dynamic logical volume 21 or the deletion of a physical storage extent of the parity group from the dynamic logical volume 21 regarding the corresponding extent (S6).

Next, the port processor 107 refers to the mapping table 135, and thereby checks whether a physical storage extent of the parity group 19 has already been allocated to the corresponding extent (S7).

And, when a physical storage extent of the parity group 19 has not been allocated to the corresponding extent (S7: NO), the port processor 107 creates, for instance, transfer data indicating that no data is stored or transfer data of all "0" since data is not stored in the corresponding extent (S8).

Contrarily, when the SCSI command is not a read command to the dynamic logical volume 21 (S5: NO), or when a physical storage extent of the parity group 19 has been allocated to the corresponding extent (S7: YES), the port processor 107 checks whether the data stored in the physical storage extent is stored as cache data 131 in the shared memory unit 102 since the SCSI command is a read command to the static logical volume 20, or a physical storage extent of the parity group 19 has been allocated to the corresponding extent of the dynamic logical volume 21, and the LBA of the physical storage extent of the parity group 19 is determinate (S9).

And, when the data stored in the physical storage extent is stored as cache data 131 in the shared memory unit 102 (cache hit) (S9: YES), the port processor 107 reads such cache data 131 as transfer data from the shared memory unit 102 (S10).

Contrarily, when the data stored in the physical storage extent is not stored as cache data 131 in the shared memory unit 102 (cache miss) (S9: NO), the port processor 107 calls the RAID control program so that the disk processor 110 controls the RAID control program, reads the data stored in the physical storage extent and stores this as cache data 131 in the shared memory unit 102, and reads such cache data 131 as the transfer data from the shared memory unit 102 (S11).

The port processor 107 eventually transfers the transfer data to the host 12 (S12).

Next, the port processor 107 checks whether the SCSI command received from the host 12 is a read command to the dynamic logical volume 21 (S13).

And, when the SCSI command received from the host 12 is a read command to the dynamic logical volume 21 (S13: YES), the port processor 107 refers to the dynamic logical volume mode management table 133 and checks whether the dynamic logical volume 21 subject to the read command is in a flag operation mode (S14).

And, when the dynamic logical volume 21 subject to the read command is in a flag operation mode (S14: YES), the port processor 107 refers to the pool management table 134 and changes the access flag management column 193 of the corresponding extent to "TRUE" (S15).

Next, the port processor 107 refers to the mapping table 135 and changes the lock flag management column 203 of the corresponding extent to "FALSE", and thereby unlocks the extent to be read so as to cancel the prohibition of reading and writing data based on the SCSI command from the host 12, and canceling the prohibition of allocation of a physical storage extent of the parity group 19 to the dynamic logical volume 21, or deletion of a physical storage extent of the parity group 19 from the dynamic logical volume 21 regarding the corresponding extent (S16).

Eventually, the port processor 107 thereafter ends the command processing routine RT1 during the reading of data shown in FIG. 13 (S17).

Figure 14:
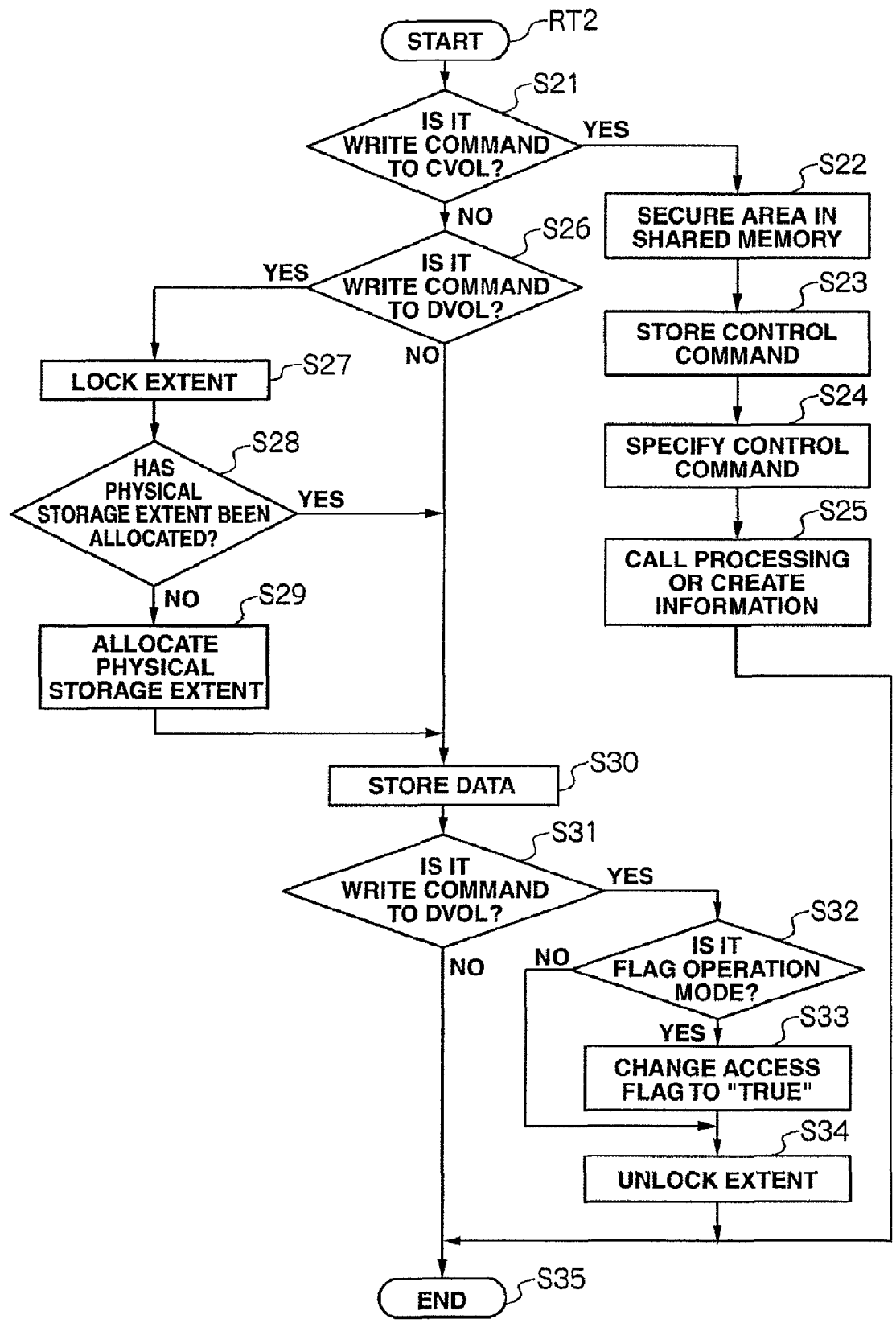
FIG. 14 is a flowchart for explaining the command processing at the time of writing data.

FIG. 14 is a flowchart showing the specific processing routine of the storage apparatus 11 concerning the command processing during the writing of data in the storage system 1.

When the port processor 107 initially receives a SCSI command from the host 12 according to the command processing routine RT2 during the writing of data shown in FIG. 14 by executing the command processing program 123, it checks whether the SCSI command is a write command to the control logical volume 22 (S21).

And, when the SCSI command is a write command to the control logical volume 22 (S21: YES), the port processor 107 subsequently secures an area for storing the control command to be sent from the host 12 in the shared memory unit 102 (S22). Next, the port processor 107 stores the control command sent from the host 12 (S23).

Next, the port processor 107 specifies the type of control command stored in the shared memory unit 102 (S24). As the control command sent from the host 12, for instance, there is a control command commanding the start of the extent release program 125.

Next, the port processor 107 calls the corresponding processing or creates the corresponding information based on such control command (S25).

Contrarily, when the SCSI command is not a write command to the control logical volume 22 (S21: NO), the port processor 107 checks whether the SCSI command received from the host 12 is a write command to the dynamic logical volume 21 (S26).

And, when the SCSI command is a write command to the dynamic logical volume 21 (S26: YES), the port processor 107 refers to the mapping table 135 and changes the lock flag management column 203 of the corresponding extent to "TRUE", and thereby locks the corresponding (S27).

Next, the port processor 107 refers to the mapping table 135, and thereby checks whether a physical storage extent of the parity group 19 has already been allocated to the corresponding extent (S28).

And, when a physical storage extent of the parity group 19 has not been allocated to the corresponding extent (S28: NO), the port processor 107 allocates a physical storage extent of the parity group 19 to such extent (S29).

Next, when the SCSI command is not a write command to the dynamic logical volume 21 (S26: NO), a physical storage extent of the parity group 19 has already been allocated to the corresponding extent (S28: YES), or a physical storage extent of the parity group 19 has been allocated to the corresponding extent (S29), the port processor 107 checks whether the data stored in the physical storage extent is stored as cache data 131 in the shared memory unit 102 since the SCSI command is a read command to the static logical volume 20, or a physical storage extent of the parity group 19 has been allocated to the corresponding extent of the dynamic logical volume 21, and the LBA of the physical storage extent of the parity group 19 is determinate (S30).

Here, when the cache data 131 of data stored in the physical storage extent of the corresponding parity group 19 is stored in the shared memory unit 102, the port processor 107 overwrites this cache data 131, and, when the cache data 131 of data stored in the physical storage extent of the corresponding parity group 19 is not stored in the shared memory unit 102, the port processor 107 secures an area in the shared memory unit 102 and stores the cache data 131.

Next, the port processor 107 checks whether the SCSI command received from the host 12 is a write command to the dynamic logical volume 21 (S31).

And, when the SCSI command received from the host 12 is a write command to the dynamic logical volume 21 (S31: YES), the port processor 107 refers to the dynamic logical volume mode management table 133 and checks whether the dynamic logical volume 21 subject to the write command is in a flag operation mode (S32).

And, when the dynamic logical volume 21 subject to the write command is in a flag operation mode (S32: YES), the port processor 107 refers to the pool management table 134 and changes the access flag management column 193 of the corresponding extent to "TRUE" (S33).

Next, the port processor 107 refers to the mapping table 135 and changes the lock flag management column 203 of the corresponding extent to "FALSE", and thereby unlocks the corresponding extent (S34).

Eventually, the port processor 107 thereafter ends the command processing routine RT2 during the writing of data shown in FIG. 14 (S35).

(1-3) Capacity Information Acquisition Processing and Nonuse Extent Release Processing in First Embodiment (1-3-1) Overall Processing Flow of Capacity Information Acquisition Processing and Nonuse Extent Release Processing Next, the overall processing flow of capacity information acquisition processing and nonuse extent release processing of the storage system 1 in the first embodiment is explained with reference to FIG. 15 to FIG. 17. The storage system 1 according to the present embodiment is characterized in that the storage apparatus 11 manages the storage extent including the LBA recognized as being currently used by the host 12, and releases the physical storage extent recognized as not being currently used by the host 12 from the dynamic logical volume 21.

Figure 15:
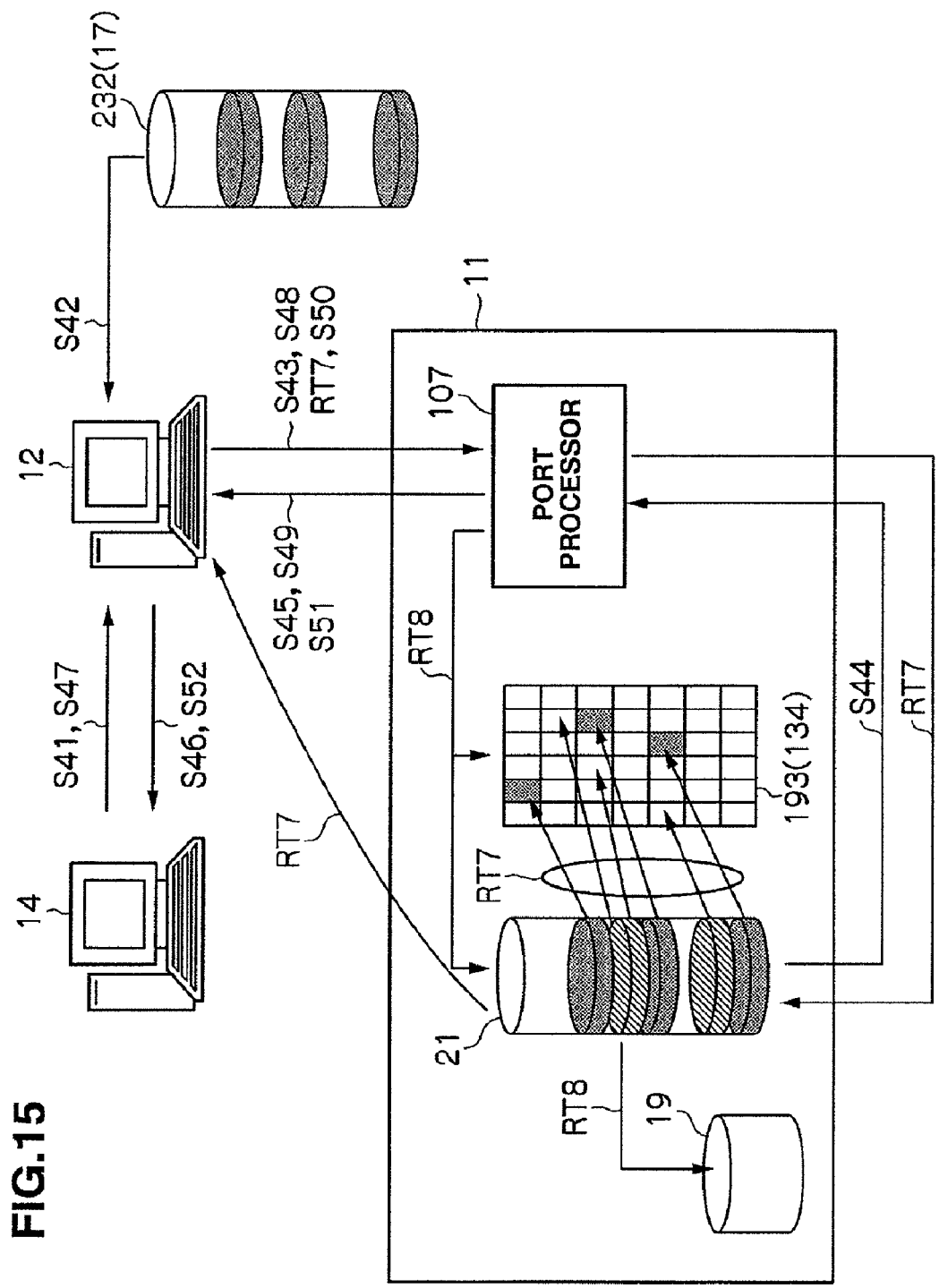
FIG. 15 is a conceptual diagram schematically showing the contents of the overall processing flow of capacity information acquisition processing and nonuse extent release processing in the first embodiment.

FIG. 15 is a conceptual diagram schematically showing the contents of the overall processing flow of the capacity information acquisition processing and nonuse extent release processing in the first embodiment. Further, FIG. 16 and FIG. 17 are flowcharts showing the specific processing routine of the storage apparatus 11, host 12 and management server 14 concerning the overall processing flow of the capacity information acquisition processing and nonuse extent release processing in this storage system 1.

Figure 16:
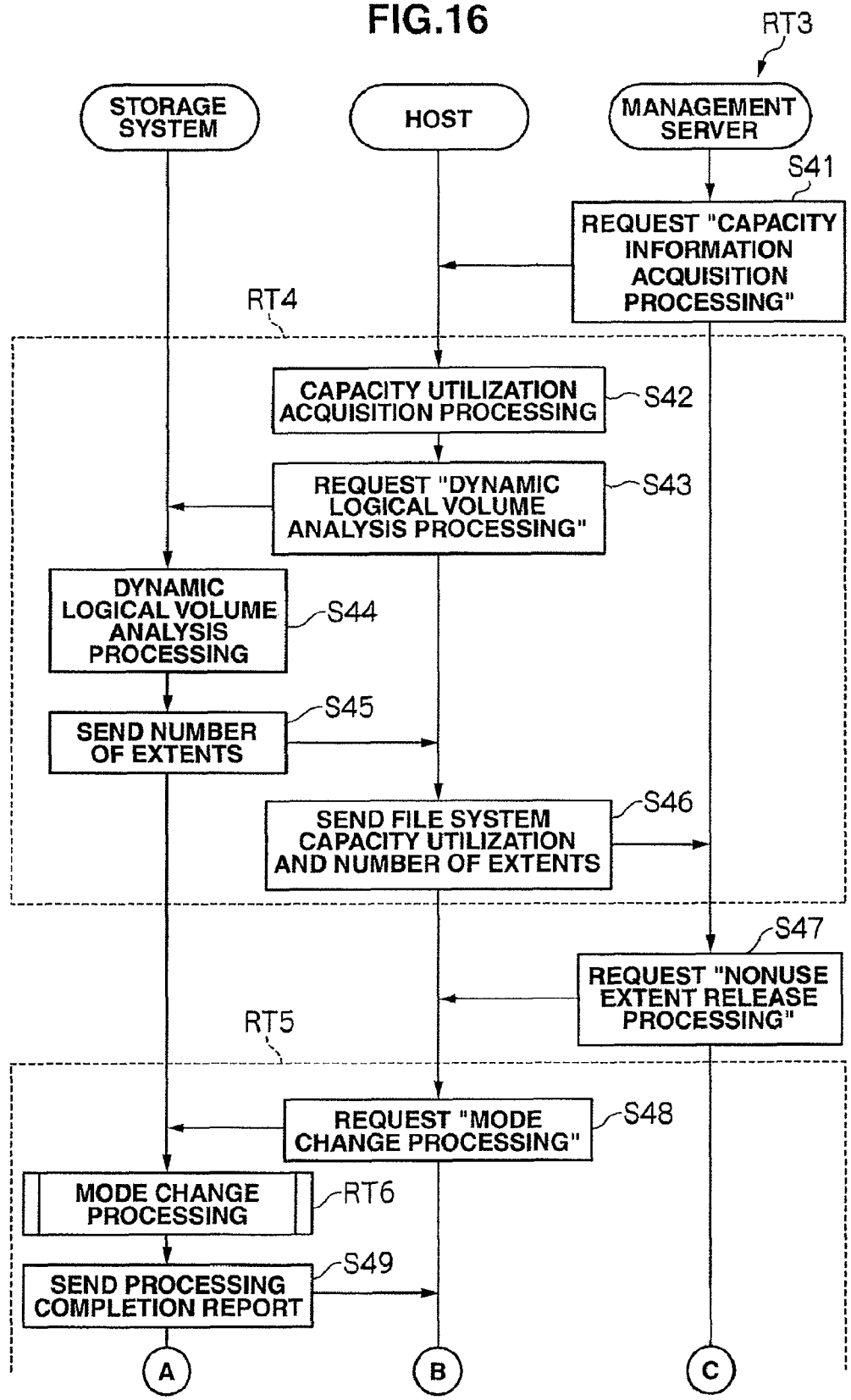
FIG. 16 is a flowchart for explaining the overall processing flow of capacity information acquisition processing and nonuse extent release processing.
Figure 17:
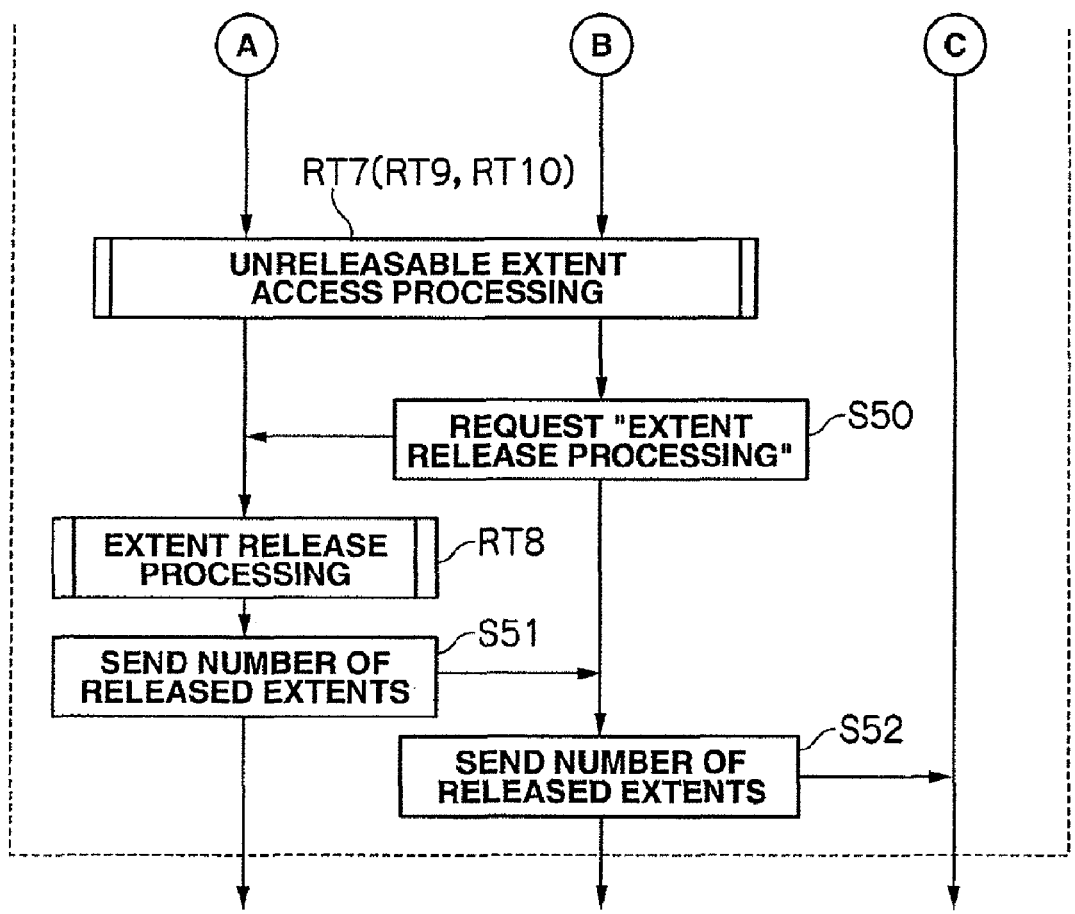
FIG. 17 is a flowchart for explaining the overall processing flow of capacity information acquisition processing and nonuse extent release processing.

When a dynamic logical volume management processing program 291, which is a program for executing the capacity information acquisition processing and nonuse extent release processing, is initially activated according to the capacity information acquisition/nonuse extent release processing routine RT3 shown in FIG. 16 and FIG. 17 at a prescribed timing or according to the operation of an administrator or the like, the CPU 261 of the management server 14 requests the host 12 to execute "capacity information acquisition processing" (S41).

When the CPU 211 of the host 12 is requested by the management server 14 to execute the "capacity information acquisition processing", it executes the capacity utilization acquisition processing and acquires the capacity utilization of each file system 232 regarding the file systems 232 (host volumes 17) corresponding to the dynamic logical volume 21 (S42).

Next, the CPU 211 of the host 12 requests the storage apparatus 11 to execute the "dynamic logical volume capacity information acquisition processing" (S43).

Next, when the port processor 107 of the storage apparatus 11 is requested by the host 12 to execute the "dynamic logical volume capacity information acquisition processing", it executes the dynamic logical volume analysis processing, and acquires the number of extents indicating the number of physical storage extents of the parity group 19 allocated to each dynamic logical volume 21 (S44).

Next, the port processor 107 of the storage apparatus 11 sends the acquired number of extents per dynamic logical volume 21 to the host 12 (S45).

Next, when the CPU 211 of the host 12 receives the number of extents per dynamic logical volume 21, it sends this together with the capacity utilization per corresponding file system 232 to the management server 14 (S46).

Next, when the CPU 261 of the management server 14 receives the number of extents per dynamic logical volume 21 and the capacity utilization per corresponding file system 232, for example, it calculates the difference between the capacity utilization based on the number of extents of the dynamic logical volume 21 and the capacity utilization of the corresponding file system 232, selects a prescribed number of file systems 232 with a large difference, and requests the host 12 to execute the "nonuse extent release processing" regarding the selected file systems 232 (S47).

Incidentally, the CPU 261 of the management server 14 may also sequentially calculate the difference between the capacity utilization based on the number of extents of the dynamic logical volume 21 and the capacity utilization of the corresponding file system 232, rearrange these in order from the largest difference, display the result on the display device 270, and have an administrator or the like select the file system 232 to execute the nonuse extent release processing, and thereby request the host 12 to execute the "nonuse extent release processing" regarding the selected file systems 232.

Further, incidentally, the CPU 261 of the management server 14 may also sequentially calculate the ratio of the capacity utilization based on the number of extents of the dynamic logical volume 21 and the capacity utilization of the corresponding file system 232, and thereby request the host to execute the "nonuse extent release processing" regarding a prescribed number of file systems 232 with a large ratio. In other words, what is important is that a request is made to the host 12 for executing the "nonuse extent release processing" to a file system 232 having a large divergence between the capacity utilization based on the number of extents of the dynamic logical volume 21 and the capacity utilization of the corresponding file system 232.

Next, when the CPU 211 of the host 12 is requested by the management server 14 to execute the "nonuse extent release processing", it executes the nonuse extent release processing and requests the storage apparatus 11 to execute the "mode change processing" (S48).

Next, when the port processor 107 of the storage apparatus 11 is requested by the host 12 to execute the "mode change processing", it executes the mode change processing, and changes the dynamic logical volume 21 corresponding to the selected file system 232 to the flag operation mode (RT6).

Next, the port processor 107 of the storage apparatus 11 transmits a completion report of the "mode change processing" to the host 12 (S49).

Next, when the CPU 211 of the host 12 receives the completion report of the "mode change processing", it executes the unreleasable extent access processing, sends to the storage apparatus 11 a read command regarding data of the LBA recognizing that the file system 232 is currently storing data and is in use, makes the port processor 107 of the storage apparatus 11 change the access flag management column 193 of the extent corresponding to the data to be read to "TRUE" based on the read command, and send the data to be read to the host 12 (RT7).

Next, when the CPU 211 of the host 12 finishes reading data of the LBA currently recognized by the file system 232, it requests the storage apparatus 11 to execute the "extent release processing" (S50).

Next, when the port processor 107 of the storage apparatus 11 is requested by the host 12 to execute the "extent release processing", it executes the extent release processing, and releases the physical storage extent of the parity group 19 allocated to an extent in which the access flag management column 193 is "FALSE" (RT8).

Next, the port processor 107 of the storage apparatus 11 sends the number of released extents to the host 12 (S51).

Next, when the CPU 211 of the host 12 receives the number of released extents, it sends such number of released extents to the management server 14 (S52).

Incidentally, the CPU 261 of the management server 14 displays the number of released extents on the display device 270 so as to enable the administrator or the like to confirm the results of the nonuse extent release processing.

(1-3-2) Capacity Information Acquisition Processing

Figure 18:
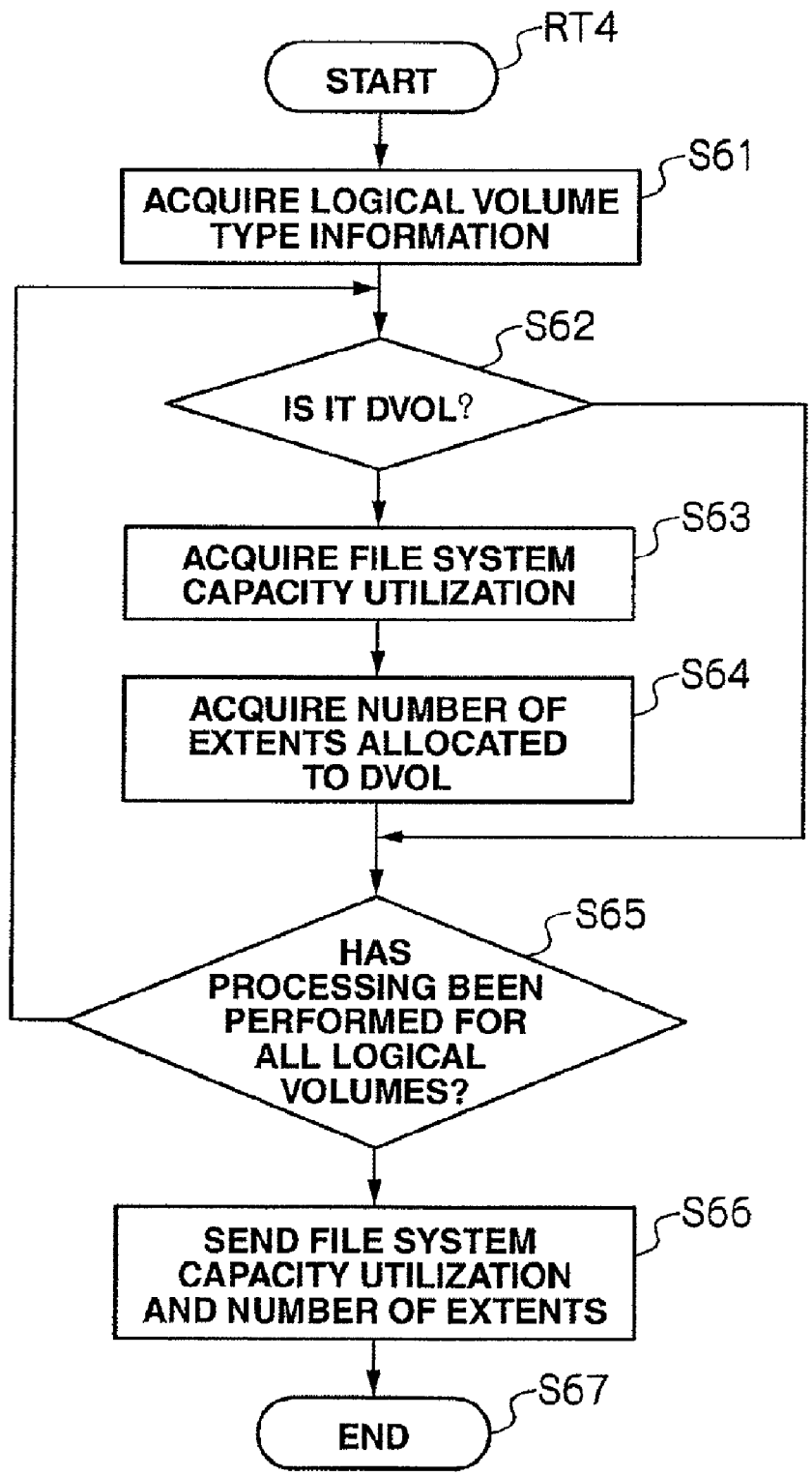
FIG. 18 is a flowchart for explaining capacity information acquisition processing.

Next, capacity information acquisition processing of the storage system 1 in the first embodiment is explained in detail. FIG. 18 is a flowchart showing the specific processing routine of the host 12 and storage apparatus 11 concerning the capacity information acquisition processing in the storage system 1.

When the CPU 211 of the host 12 is initially requested by the management server 14 to execute the "capacity information acquisition processing", it acquires the logical volume type information according to the capacity information acquisition processing routine RT4 shown in FIG. 18 by executing the capacity information acquisition processing program 251, which is a program for acquiring the capacity utilization of the file system 232 and the number of physical storage extents of the parity group 19 allocated to the corresponding dynamic logical volume 21 (S61).

Here, the CPU 211 of the host 12 creates a control command for commanding the logical volume type information acquisition, and sends this control command to the shared memory unit 102 (control logical volume 22) of the storage apparatus 11.

The port processor 107 of the storage apparatus 11 refers to the logical volume type management table 122 and creates logical volume type information based on the control command commanding the acquisition of logical volume type information, secures an area in the shared memory unit 102 and stores the acquired logical volume type information in the shared memory unit 102. And, the port processor 107 of the storage apparatus 11 sends the logical volume type information to the main memory 212 of the host 12.

Next, the CPU 211 of the host 12 refers to the logical volume type information, and thereby checks whether the type of logical volume 16 is a dynamic logical volume 21 (S62).

And, when the type of logical volume 16 is a dynamic logical volume 21 (S63), the CPU 211 of the host 12 activates the capacity information acquisition processing program 251 of the host agent program 233, performs the file system capacity utilization acquisition processing by executing the capacity utilization acquisition processing program 243 of the file system 232, and thereby acquires the capacity utilization of the file system 232 (S63).

Next, the CPU 211 of the host 12 acquires the number of physical storage extents of the parity group 19 allocated to the dynamic logical volume 21 corresponding to the file system 232 (S64).

Here, the CPU 211 of the host 12 creates a control command for commanding the start of the dynamic logical volume analysis processing, and sends this control command to the shared memory unit 102 (control logical volume 22) of the storage apparatus 11.

The port processor 107 of the storage apparatus 11 performs dynamic logical volume analysis processing by executing the dynamic logical volume analysis processing program 126 based on the control command commanding the start of the dynamic logical volume analysis processing, acquires the number of physical storage extents of the parity group 19 allocated to the dynamic logical volume 21, secures an area in the shared memory unit 102, and stores the number of extents in the shared memory unit 102. And, the port processor 107 of the storage apparatus 11 sends the number of extents to the main memory 212 of the host 12.

Contrarily, when the type of logical volume 16 is not a dynamic logical volume 21 (S62: NO), or when the number of physical storage extents of the parity group 19 allocated to the dynamic logical volume 21 corresponding to the file system 232 is acquired (S64), the CPU 211 of the host 12 checks whether the file system capacity utilization acquisition processing and dynamic logical volume analysis processing have been executed regarding all logical volumes 16 in the logical volume type information (S65).

And, when the file system capacity utilization acquisition processing and dynamic logical volume analysis processing have not been executed regarding all logical volumes 16 in the logical volume type information (S65: NO), the CPU 211 of the host 12 thereafter checks whether the type of the subsequent logical volume 16 is a dynamic logical volume 21 (S62), and thereafter repeats the same processing steps (S62 to S65-S62).

Contrarily, when the file system capacity utilization acquisition processing and dynamic logical volume analysis processing have been executed regarding all logical volumes 16 in the logical volume type information (S65: YES), the CPU 211 of the host 12 sends the acquired number of extents per dynamic logical volume 21 and capacity utilization per file system 232 corresponding to each dynamic logical volume 21 to the management server 14 (S66).

Eventually, the CPU 211 of the host 12 thereafter ends the capacity information acquisition processing routine RT4 shown in FIG. 18 (S67).

(3-3) Nonuse Extent Release Processing

Figure 19:
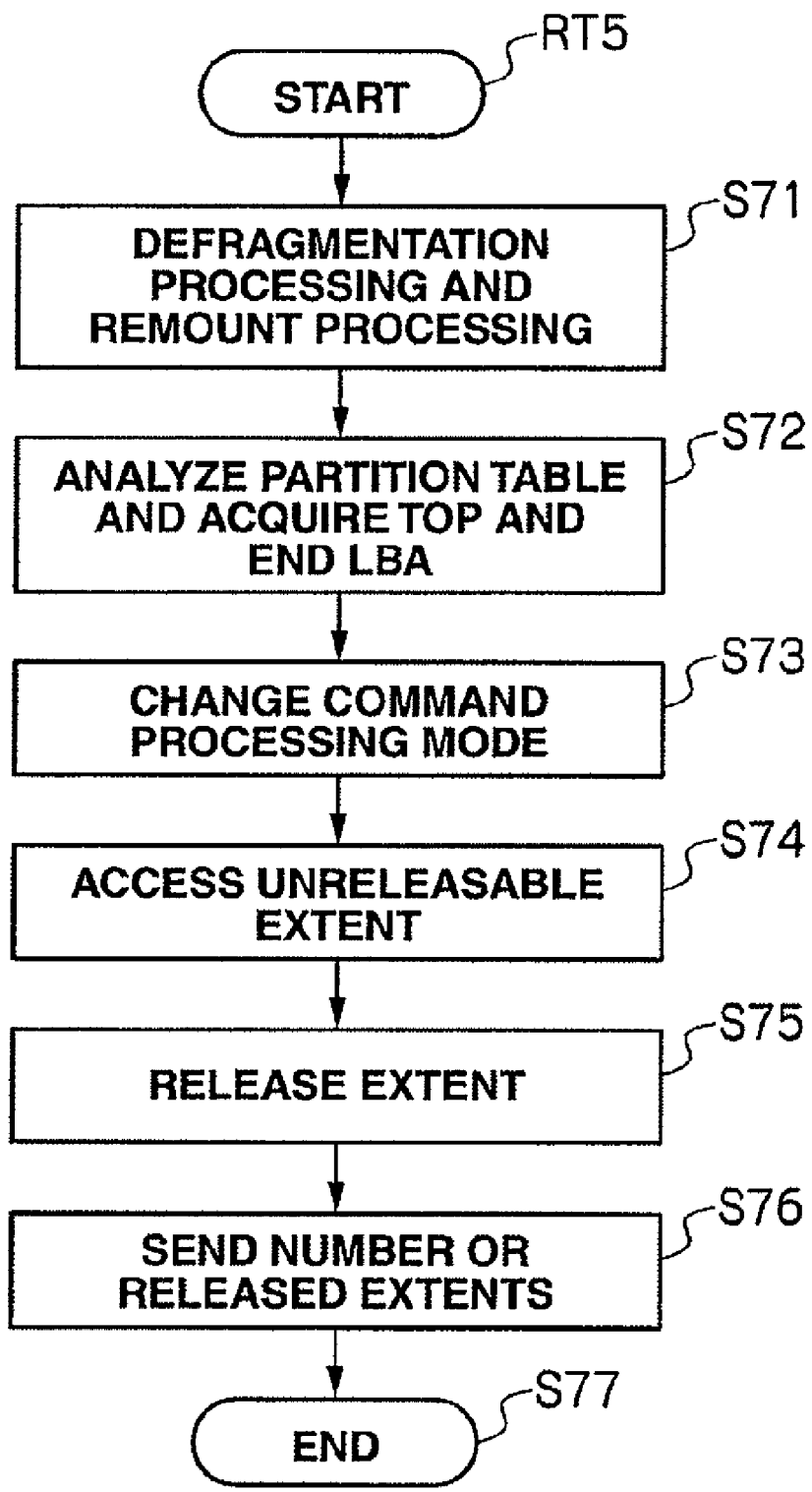
FIG. 19 is a flowchart for explaining nonuse extent release processing.

Next, nonuse extent release processing of the storage system 1 in the first embodiment is explained in detail. FIG. 19 is a flowchart showing the specific processing routine of the storage apparatus 11 and host 12 concerning the nonuse extent release processing in this storage system 1.

When the CPU 211 of the host 12 is initially requested by the management server 14 to execute "nonuse extent release processing", it executes defragmentation processing and remount processing regarding the file system 232 according to the nonuse extent release processing routine RT5 shown in FIG. 19 by activating the nonuse extent release processing program 252, which is a program for releasing a storage extent recognized as being currently used by the host 12 from the dynamic logical volume 21 regarding the physical storage extent of the parity group 19 allocated to the dynamic logical volume 21 corresponding to the selected file system 232 (S71).

Here, the CPU 211 of the host 12 calls the defragmentation processing program 242 of the file system 232 and controls the defragmentation processing program 242, and thereby repeats the reading and writing of data stored in the dynamic logical volume 21 so as to serialize the nonuse area of data stored non-serially in the dynamic logical volume 21.

Further, here, the CPU 211 of the host 12 sends the cache data, which is dirty data retained by the file system 232, to the storage apparatus 11 so as to reflect it in the storage apparatus 11.

Next, the CPU 211 of the host 12 acquires a partition table from the storage apparatus 11 regarding the dynamic logical volume 21 corresponding to this file system 232, analyzes this partition table, and thereby acquires the top LBA and end LBA of the corresponding dynamic logical volume 21 (S72).

Here, the partition table is information for managing the top LBA and end LBA of the logical volume, and is generally stored in the top block (number "0" of LBA) of the logical volume.

Thus, the CPU 211 of the host 12 designates number "0" of the LBA and executes the read command, reads and acquires the partition table from the dynamic logical volume 21, and analyzes the acquired partition table so as to specify the top LBA and end LBA of the dynamic logical volume 21 corresponding to the file system 232.

Next, the CPU 211 of the host 12 changes the command processing mode of the dynamic logical volume 21 corresponding to the file system 232 from the normal mode to the flag operation mode (S73).

Here, the CPU 211 of the host 12 creates a control command for commanding the start of the mode change processing, and sends this control command to the shared memory unit 102 (control logical volume 22) of the storage apparatus 11.

Figure 20:
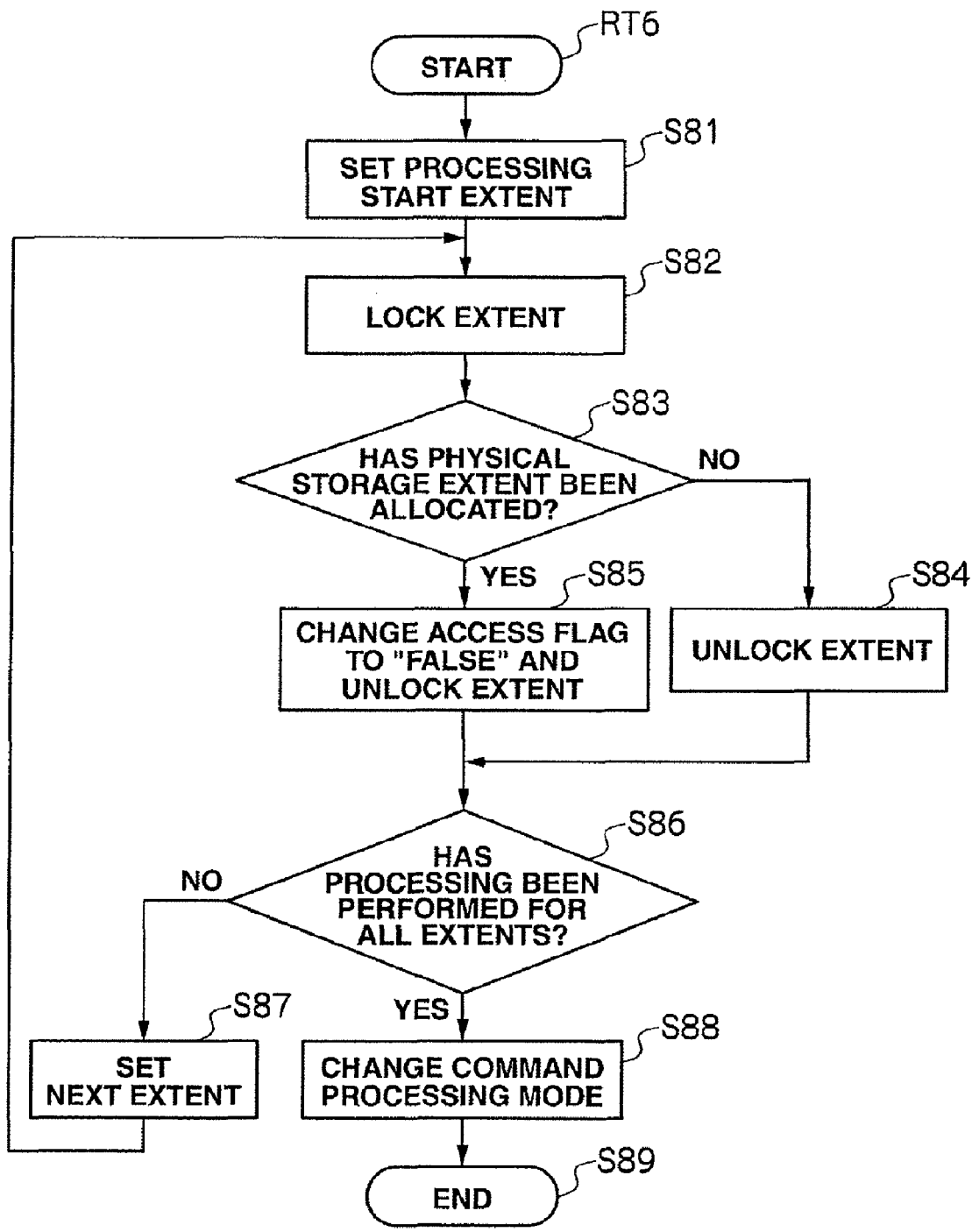
FIG. 20 is a flowchart for explaining mode change processing.

Mode change processing of the storage system 1 in the first embodiment is now explained in detail. FIG. 20 is a flowchart showing the specific processing routine of the storage apparatus 11 concerning the mode change processing in this storage system 1.

When the port processor 107 of the storage apparatus 11 specifies that it is a control command commanding the start of mode change processing, it executes the mode change processing according to the mode change processing routine RT6 shown in FIG. 20, calculates the extent to start the mode change processing from the LBA range for resetting the access flag management column 193 designated by such control command and sets such extent as the extent for starting the mode change processing by changing the command processing mode of the dynamic logical volume 21 from the normal mode to the flag operation mode, and executing the mode change program 124 which is a program for resetting the access flag management column 193 (S81).

Next, the port processor 107 of the storage apparatus 11 refers to the mapping table 135 and changes the lock flag management column 203 of the set extent to "TRUE", and thereby locks the set extent (S82).

Next, the port processor 107 of the storage apparatus 11 refers to the mapping table 135 and thereby checks whether a physical storage extent of the parity group 19 has already be allocated to the set extent (S83).

And, when a physical storage extent of the parity group 19 has not been allocated to the set extent (S83: NO), the port processor 107 of the storage apparatus 11 refers to the mapping table 135 and changes the lock flag management column 203 of the set extent to "FALSE", and thereby unlocks the set extent (S84).

Contrarily, when a physical storage extent of the parity group 19 has already be allocated to the set extent (S83:YES), the port processor 107 of the storage apparatus 11 refers to the pool management table 134 and changes the access flag of the set extent to "FALSE", and refers to the mapping table 135 and changes the lock flag management column 203 of the set extent to "FALSE", and thereby unlocks the set extent (S85).

Next, the port processor 107 of the storage apparatus 11 checks whether the processing sequence at step S83 to step S85 has been executed regarding all extents in the LBA range for resetting the access flag designated by the control command (S86).

Next, when the processing sequence at step S83 to step S85 has not been executed regarding all extents (S86: NO), the port processor 107 of the storage apparatus 11 thereafter sets an extent as the extent to execute the subsequent processing sequence (S87), and thereafter repeats the same processing steps (S82 to S86-S87, S82).

Contrarily, when the processing sequence at step S83 to step S85 has been executed regarding all extents (S86: YES), the port processor 107 of the storage apparatus 11 refers to the dynamic logical volume mode change table 133, changes the command processing mode management column 182 corresponding to the dynamic logical volume 21 corresponding to the file system 232 from the normal mode to the flag change mode (S88), and thereafter ends the mode change processing routine RT6 shown in FIG. 20 (S89).

And, the port processor 107 of the storage apparatus 11 sends a report to the host 12 indicating that the mode change processing is complete, and the command processing mode of the dynamic logical volume 21 corresponding to the file system 232 was changed from the normal mode to the flag operation mode.

Returning to FIG. 19, next, the CPU 211 of the host 12 executes the access processing to an unreleasable extent after changing the command processing mode of the dynamic logical volume 21 corresponding to the file system 232 from the normal mode to the flag operation mode (S73).

Figure 21:
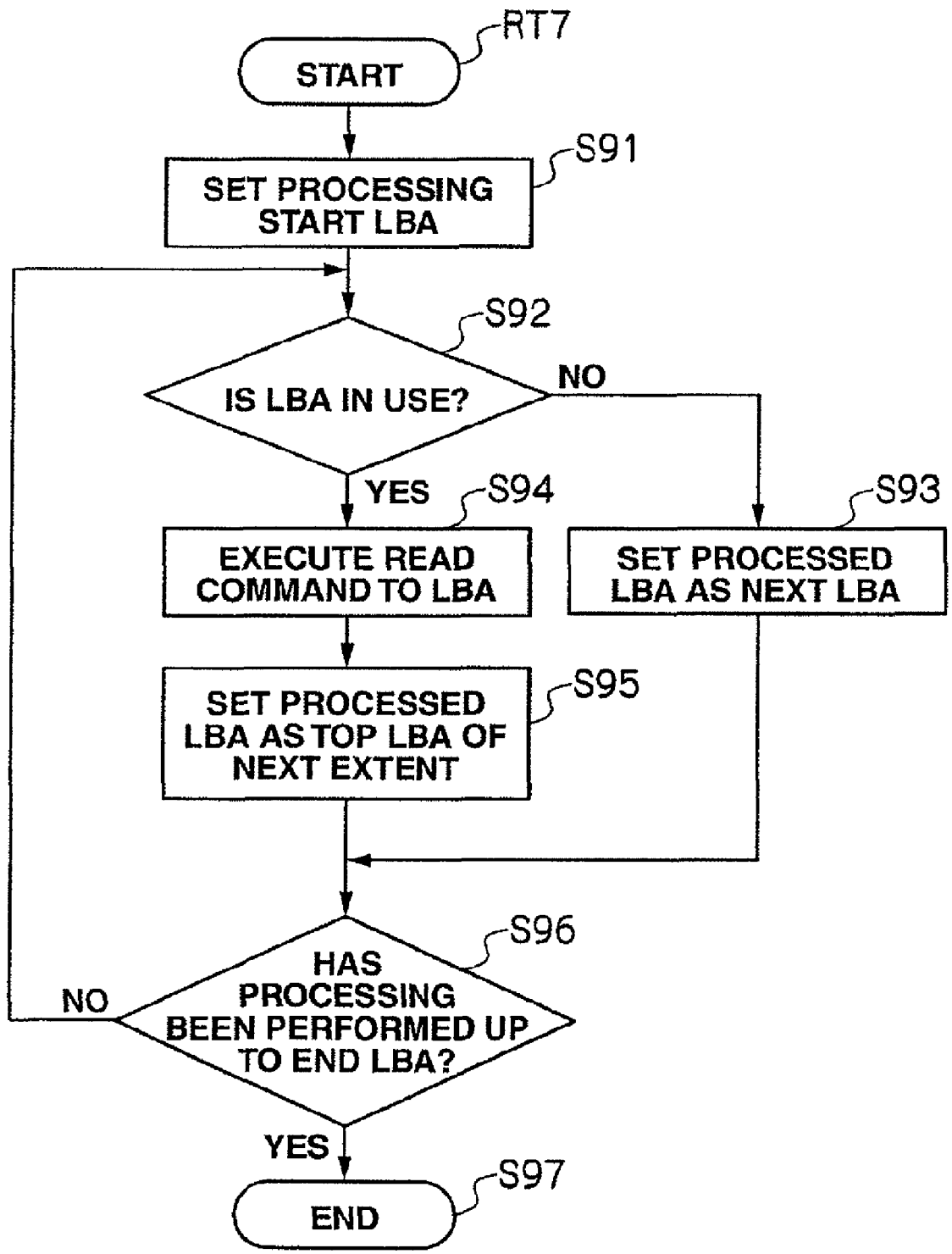
FIG. 21 is a flowchart for explaining unreleasable extent access processing in the first embodiment.

Here, unreleasable extent access processing of the storage system 1 in the first embodiment is now explained. FIG. 21 is a flowchart showing the specific processing routine of the host 12 concerning the unreleasable extent access processing in this storage system 1.

The CPU 211 of the host 12 initially executes the unreleasable extent access processing according to the unreleasable extent access processing routine RT7 shown in FIG. 21, and sets the top LBA of the dynamic logical volume 21 corresponding to the file system 232 acquired as a result of analyzing the partition table as the LBA to execute the block status acquisition processing (S91).

The CPU 211 of the host 12 performs block status acquisition processing by executing the block status acquisition processing program 244 of the file system 232 to the set LBA, and checks whether the set LBA is in use (in other words, whether data recognized by the host 12 is stored in the set LBA) (S92).

And, when the set LBA is not in use (S92: NO), the CPU 211 of the host 12 sets the LBA to execute the block status acquisition processing as the subsequent LBA (S93).

Contrarily, when the set LBA is in use (S92:YES), the CPU 211 of the host 12 reads and executes data stored in the physical storage extent corresponding to such LBA (S94).

Here, the CPU 211 of the host 12 sends a read command of data stored in the physical storage extent of such LBA to the storage apparatus 11. The port processor 107 of the storage apparatus 11 reads data to be read from the physical storage extent corresponding to the set LBA based on the read command and sends this to the host 12.

Here, since the command processing mode is the flag operation mode, the port processor 107 of the storage apparatus 11 refers to the pool management table 134 and changes the access flag management column 193 of the extent corresponding to the physical storage extent of the parity group 19 storing the data to be read to "TRUE", and thereby recognizes such extent as an unreleasable extent.

Next, when the CPU 211 of the host 12 receives the data to be read based on the read command, it sets the LBA to execute the block status acquisition processing as the top LBA of the subsequent extent (S95).

In other words, after reading the data to be read based on the read command from the corresponding extent, the CPU 211 of the host 12 will not read the data to be read based on another read command from the same extent.

Next, the CPU 211 of the host 12 checks whether the block status acquisition processing has been executed up to the end LBA (S96).

And, when the block status acquisition processing has not been executed up to the end LBA (S96: NO), the CPU 211 of the host 12 thereafter executes the block status acquisition processing to the set LBA and checks whether the set LBA is in use (S92), and thereafter repeats the same processing steps (S92 to S96-S92).

Contrarily, when the block status acquisition processing has been executed up to the end LBA (S96: YES), the CPU 211 of the host 12 thereafter ends the unreleasable extent access processing routine RT7 shown in FIG. 21 (S97).

Incidentally, when the file system 232 is LINUX (registered trademark), for instance, the CPU 211 of the host 12 acquires the block status from the inode/datablock bitmap.

Returning to FIG. 19, next, when the CPU 211 of the host 12 executes access processing to the unreleasable extent, it releases the physical storage extent of the parity group 19 corresponding to the extent to be released from the dynamic logical volume 21 (S75).

Here, the CPU 211 of the host 12 creates a control command commanding the start of the extent release processing, and sends this to the shared memory unit 102 (control logical volume 22) of the storage apparatus 11.

Figure 22:
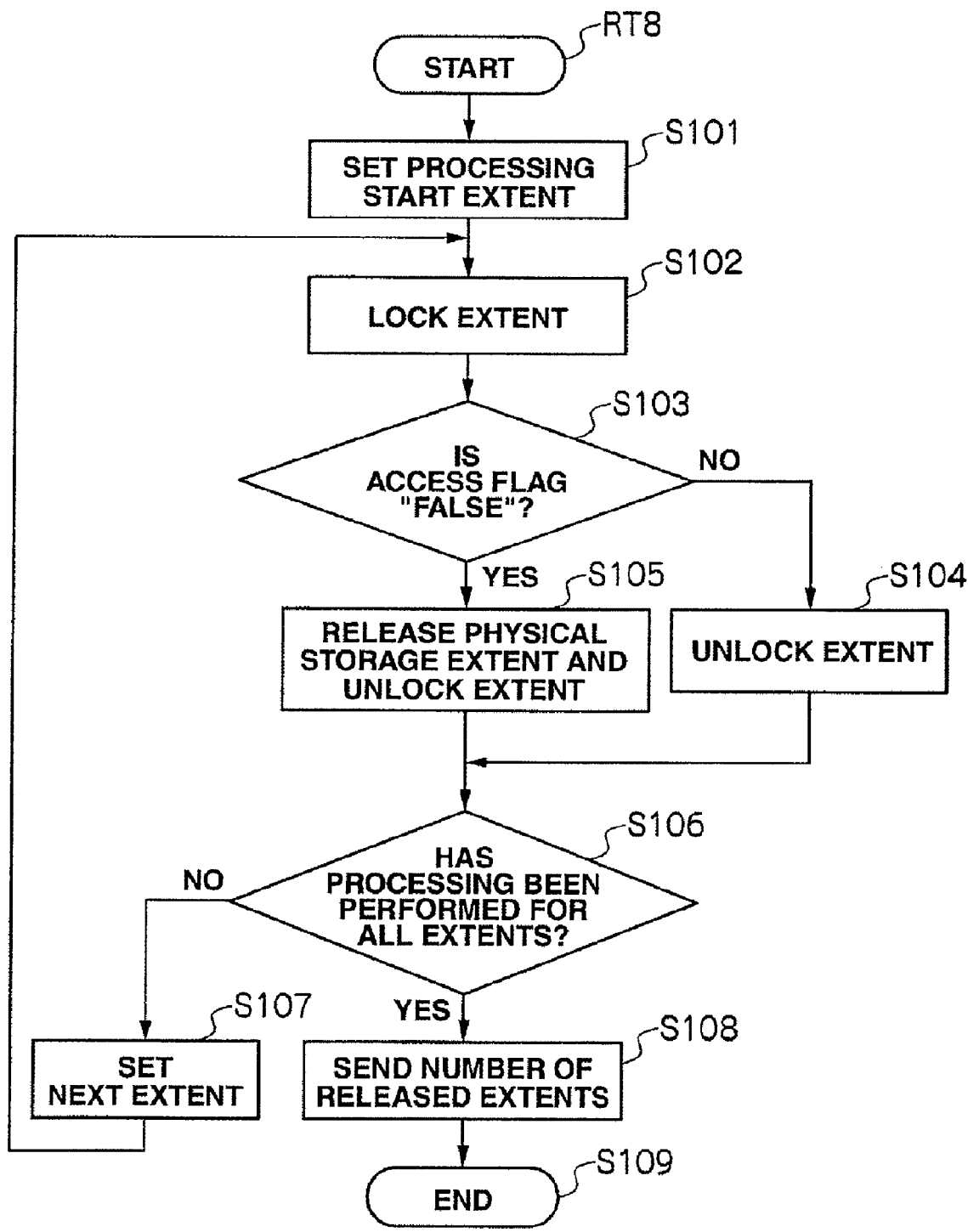
FIG. 22 is a flowchart for explaining extent release processing.

Extent release processing of the storage system 1 in the first embodiment is now explained in detail. FIG. 22 is a flowchart showing the specific processing routine of the storage apparatus 11 concerning the extent release processing in this storage system 1.

When the port processor 107 of the storage apparatus 11 specifies that it is a control command commanding the start of extent release processing, it executes the extent release processing according to the extent release processing routine RT7 shown in FIG. 21, calculates the extent to start the extent release processing from the LBA range for resetting the access flag management column 193 designated by such control command and sets such extent as the extent for starting the extent release processing by executing the extent release processing program 125 which is a program for releasing the physical storage extent of the parity group 19 corresponding to the extent to be released from the dynamic logical volume 21 (S101).

Next, the port processor 107 of the storage apparatus 11 refers to the mapping table 135 and changes the lock flag management column 203 of the set extent to "TRUE", and thereby locks the set extent (S102).

Next, the port processor 107 of the storage apparatus 11 refers to the pool management table 134 and checks whether the access flag management column 193 of the set extent is "FALSE" (S103).

And, when the access flag management column 193 of the set extent is not "FALSE" (S103: NO), the port processor 107 of the storage apparatus 11 refers to the mapping table 135 and changes the lock flag management column 203 of the set extent to "FALSE", and thereby unlocks the set extent (S104).

Contrarily, when the access flag management column 193 of the set extent is "FALSE" (S103: YES), the port processor 107 of the storage apparatus 11 refers to the pool management table 134 and changes the allocation status management column 194 of the set extent from "Allocated" to "Unused", refers to the mapping table 135 and changes the allocation status management column 204 of the set extent from "Allocated" to "Unused", changes the corresponding PG ID 205 and PG LBA start value 206 to "–", changes the lock flag management column 203 of the set extent to "FALSE", and thereby unlocks the set extent (S105).

Next, the port processor 107 of the storage apparatus 11 checks whether the processing sequence at step S102 to step S105 has been executed regarding all extents in the LBA range for resetting the access flag management column 193 designated by the control command (S106).

Next, when the processing sequence at S102 to step S105 has not been executed regarding all extents (S106: NO), the port processor 107 of the storage apparatus 11 thereafter sets an extent as the extent to execute the subsequent processing sequence (S107), and thereafter repeats the same processing steps (S102 to S106-S107, S102).

Contrarily, when the processing sequence at step S102 to step S105 has been executed regarding all extents (S106: YES), the port processor 107 of the storage apparatus 11 retains the number of released extents in the memory (not shown) of the port processor 107 and sends the number of released extents to the host 12 (S108), and thereafter ends the extent release processing routine RT8 shown in FIG. 22 (S109).

Returning to FIG. 19, next, when the CPU 211 of the host 12 releases the physical storage extent of the parity group corresponding to the extent to be released from the dynamic logical volume 21 and receives the number of released extents, it sends such number of released extents to the management server 14 (S76), and thereafter ends the nonuse extent release processing routine RT4 shown in FIG. 19 (S77).

Like this, with this storage system 1, by recognizing the extent corresponding to the physical storage extent of the parity group 19 storing the data to be read based on the read command from the host 12 as an unreleasable extent, and releasing the physical storage extent of the parity group 19 that is not recognized as an unreleasable extent from the dynamic logical volume 21, it is possible to release the unnecessary physical storage extent from the dynamic logical volume 21 without the storage apparatus 11 having to understand the configuration of the file system 232.

Further, with this storage system 1, by executing the "nonuse extent release processing" to the host 12 regarding a file system 232 having a large divergence between the capacity utilization based on the number of extents of the dynamic logical volume 21 and the capacity utilization of the corresponding file system 232, it is possible to select a file system 232 in which the utilization efficiency of the physical storage extent is inferior and the capacity utilization of the file system 232 is low in relation to the capacity utilization based on the number of extents of the dynamic logical volume 21 and execute "nonuse extent release processing", and it is possible to release even more physical storage extents.

Moreover, with this storage system 1, when the extent corresponding to the physical storage extent of the parity group 19 storing the data to be read based on the read command from the host 12 is recognized as an unreleasable extent, it is possible to effectively prevent the execution of processing for reading data from the extent recognized as an unreleasable extent by setting the LBA to execute the block status acquisition processing as the top LBA of the subsequent extent, and it is possible to further improve the unreleasable extent processing.

(2) Second Embodiment

The storage system 1 according to the second embodiment is configured the same as the storage system 1 according to the first embodiment other than that the software configuration and unreleasable extent access processing are different.

Figure 23:
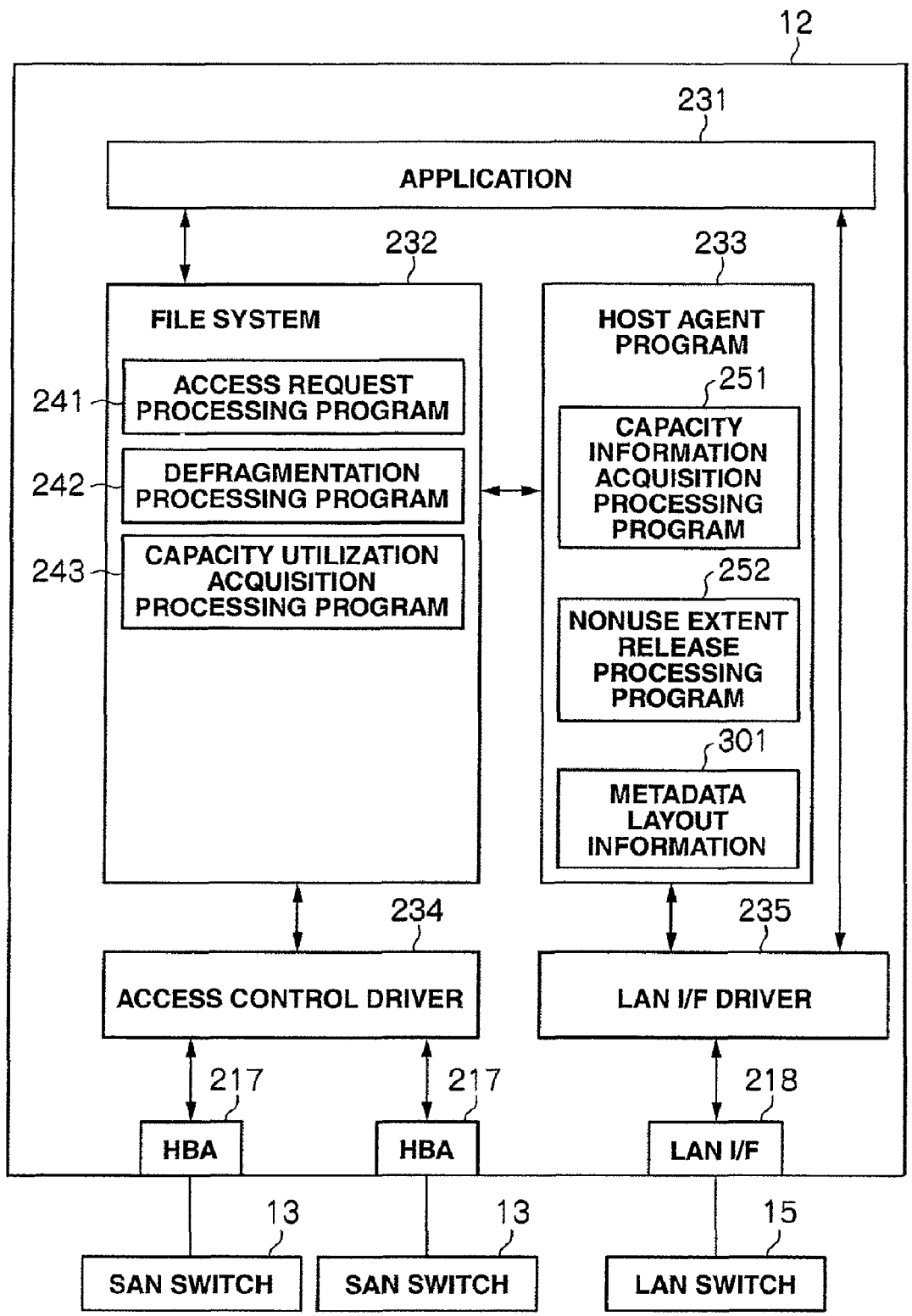
FIG. 23 is a schematic diagram showing the software configuration of the host according to the second embodiment.
Figure 24:
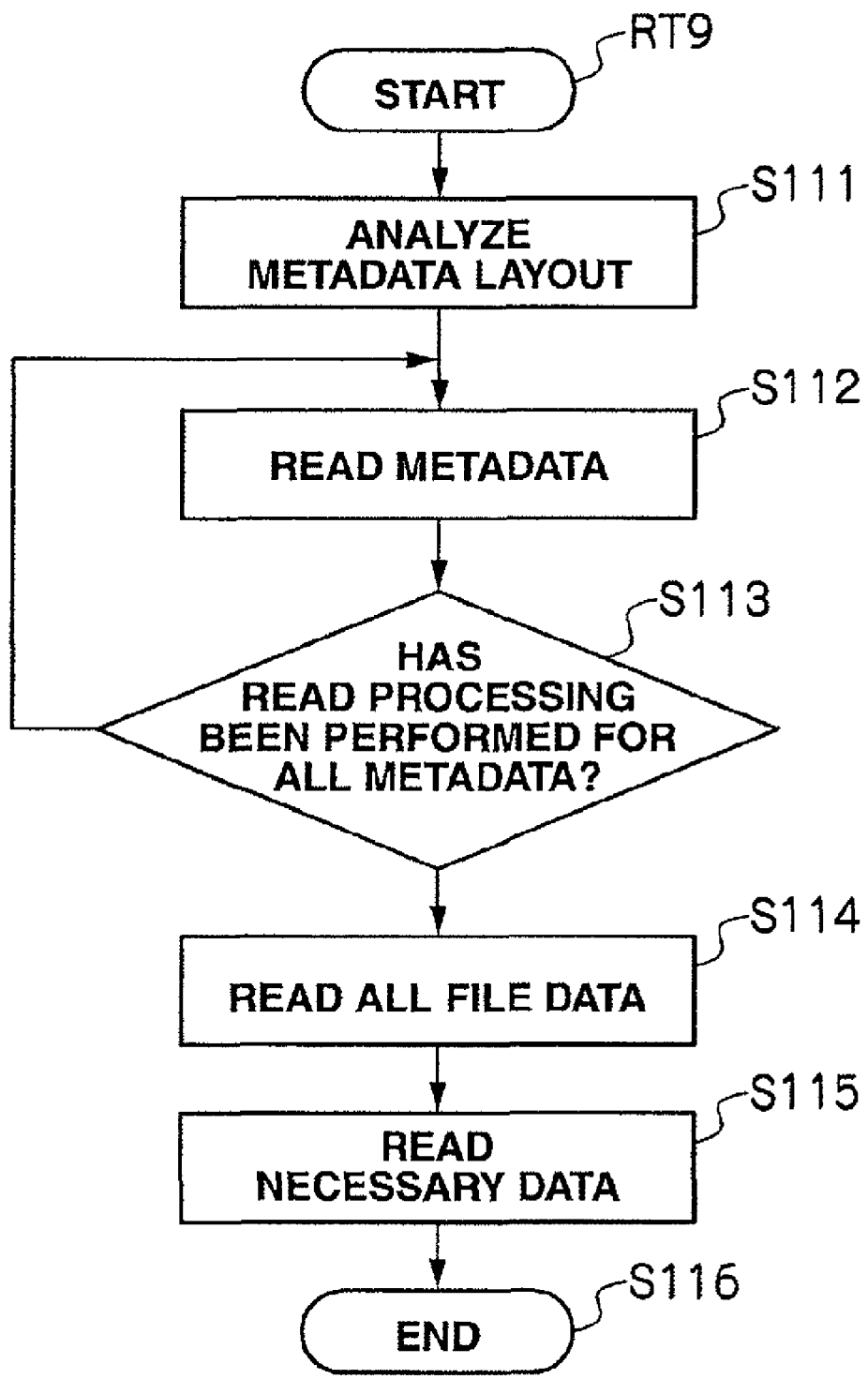
FIG. 24 is a flowchart for explaining unreleasable extent access processing in the second embodiment.

FIG. 23 is a software configuration of the host 12. The software configuration of the host 12 according to the second embodiment is configured the same as the software configuration of the host 12 according to the first embodiment other than that it does have a block status acquisition processing [program] 244, and that metadata layout information 301 has been added. Metadata layout information 301 is information showing where the metadata of the file system 232 is being stored.

Next, unreleasable extent access processing of the storage system in the second embodiment is explained in detail. FIG. 23 is a flowchart showing the specific processing routine of the host 12 concerning the unreleasable extent access processing in the storage system 1.

The CPU 211 of the host 12 initially analyzes the metadata layout from the top LBA and capacity of the dynamic logical volume 21, and metadata layout information 301, corresponding to the file system 323 acquired by executing the unreleasable extent access processing according to the unreleasable extent access processing routine RT9 shown in FIG. 23 and analyzing the partition table, and determines the metadata layout (S111). Incidentally, the CPU 211 of the host 12 proceeds to the subsequent step when it is not possible to analyze the metadata layout without reading the metadata.

Next, the CPU 211 of the host 12 acquires the LBA from the determined metadata layout, and reads and executes the metadata stored in the physical storage extent of the parity group 19 allocated to the dynamic logical volume 21 corresponding to such LBA (S112).

Here, the CPU 211 of the host 12 sends the read command of the corresponding metadata to the storage apparatus 11. The port processor 107 of the storage apparatus 11 reads the metadata to be read from the physical storage extent of the parity group 19 allocated to the dynamic logical volume 21 corresponding to the LBA block based on such read command, and sends this to the host 12. Here, since the command processing mode in the flag operation mode, the port processor 107 of the storage apparatus 11 recognizes the extent corresponding to the physical storage extent as an unreleasable extent.

Next, the CPU 211 of the host 12 checks whether a read command has been executed for all metadata of the determined metadata layout (S113).

And, when a read command has not been executed for all metadata of the determined metadata layout (S113: NO), the CPU 211 of the host 12 acquires the subsequent LBA, and executes the read command of metadata stored in the physical storage extent of the parity group 12 allocated to the dynamic logical volume 21 corresponding to such LBA (S112).

Contrarily, when a read command has been executed for all metadata of the determined metadata layout (S113: YES), the CPU 211 of the host 12 reads and executes all file data stored in the dynamic logical volume 21 (S114).

Here, the CPU 211 of the host 12 sends the read command of the corresponding file data to the storage apparatus 11. The port processor 107 of the storage apparatus 11 reads all file data stored in the dynamic logical volume 21 based on such read command, and sends this to the host 12. Here, since the command processing mode is in the flag operation mode, the port processor 107 of the storage apparatus 11 recognizes the extent corresponding to the physical storage extent storing the file data as an unreleasable extent.

Next, the CPU 211 of the host 12 reads and executes all necessary data stored in the dynamic logical volume 21 but which are not file data such as journals stored in the dynamic logical volume 2 (S115).

Here, the CPU 211 of the host 12 sends the read command of the corresponding necessary data to the storage apparatus 11. The port processor 107 of the storage apparatus 11 reads all necessary data stored in the dynamic logical volume 21 based on such read command, and sends this to the host 12. Here, since the command processing mode is in the flag operation mode, the port processor 107 of the storage apparatus 11 recognizes the extent corresponding to the physical storage extent storing the necessary data as an unreleasable extent.

Next, the CPU 211 of the host 12 thereafter ends the unreleasable extent access processing routine RT9 shown in FIG. 23 (S116).

Like this, with this storage system 1, since the file system 232 reads the metadata and file data stored in the dynamic logical volume 21, recognizes the extent corresponding to the physical storage extent storing such metadata and file data as an unreleasable extent, and releases the physical storage extent of the parity group 19 that is not recognized as an unreleasable extent from the dynamic logical volume 21, it is able to read the metadata and file data depending on a normal file system 232 without having to add a special processing program such as the block status processing program 244 as in the first embodiment, and it is thereby possible to release the unnecessary physical storage extent from the dynamic logical volume 21 with an even simpler configuration.

(3) Third Embodiment

The storage system 1 according to the third embodiment is configured the same as the storage system 1 according to the first embodiment other than that the unreleasable extent access processing is different.

Figure 25:
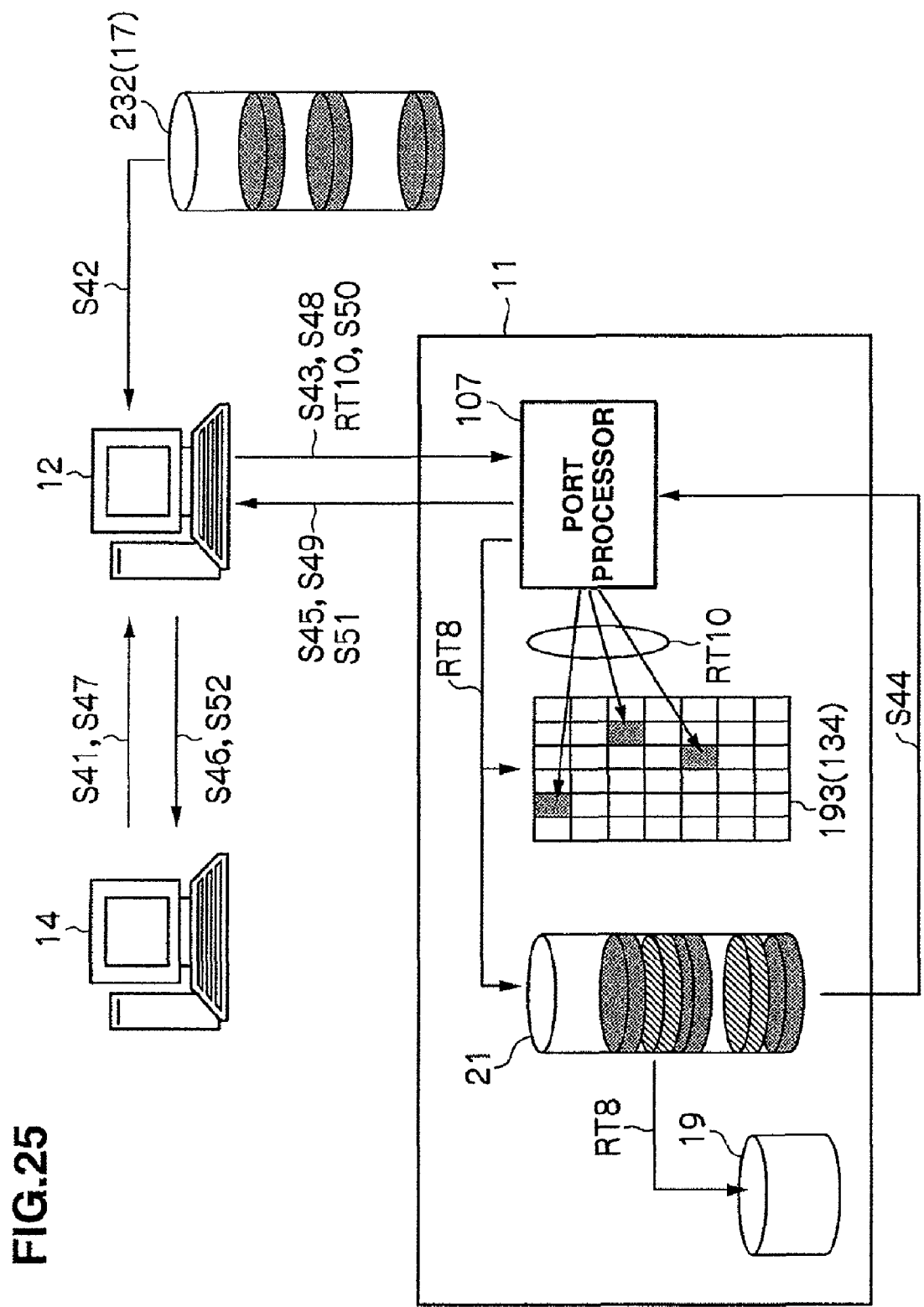
FIG. 25 is a conceptual diagram schematically showing the contents of the overall processing flow of capacity information acquisition processing and nonuse extent release processing in the first embodiment.
Figure 26:
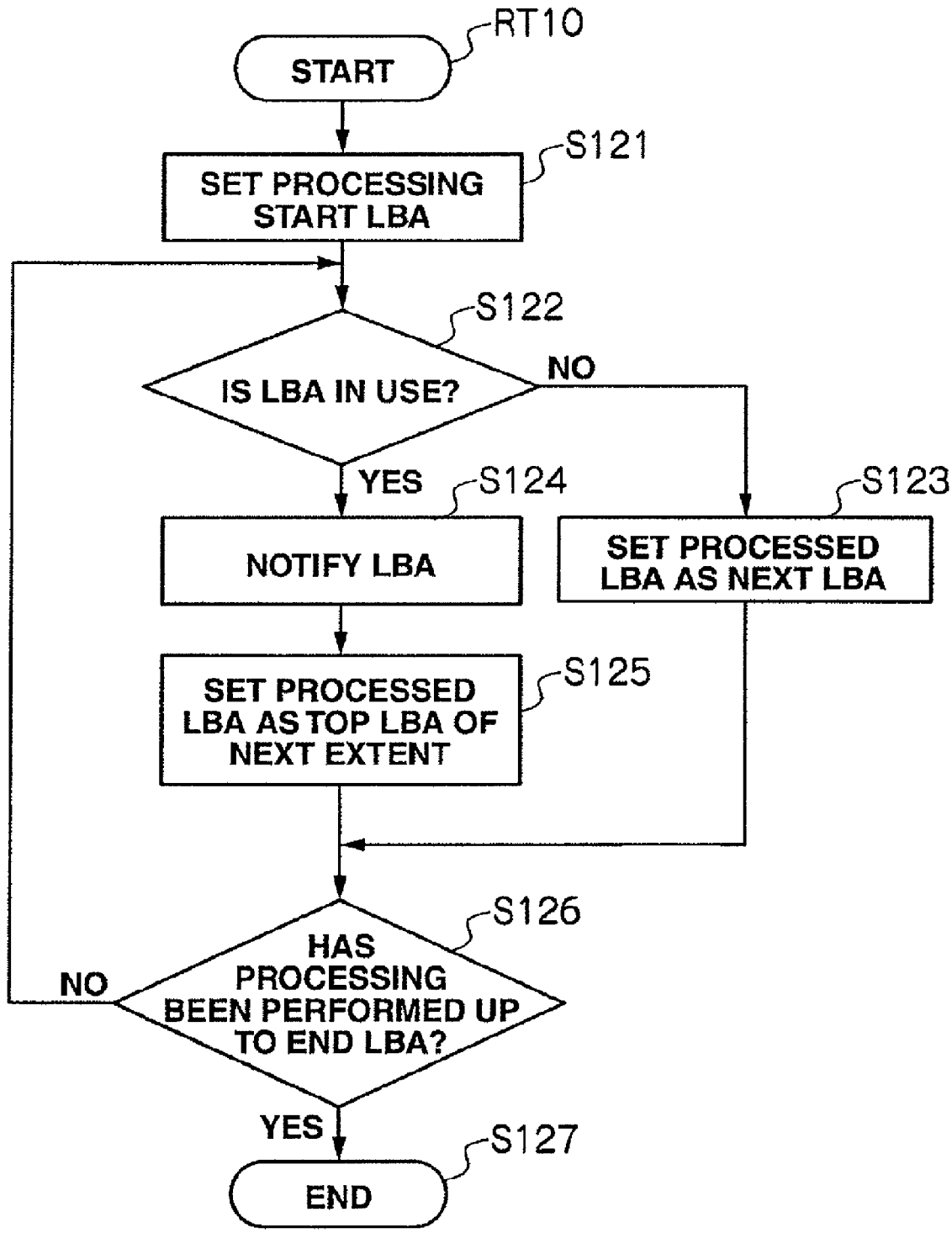
FIG. 26 is a flowchart for explaining unreleasable extent access processing in the second embodiment.

FIG. 25 is a conceptual diagram schematically showing the contents of the overall processing flow of the capacity information acquisition processing and nonuse extent release processing in the third embodiment. The unreleasable extent access processing of the storage system 1 according to the third embodiment is now explained in detail. FIG. 26 is a flowchart showing the specific processing routine of the host system concerning the unreleasable extent access processing in the storage system 1.

The CPU 211 of the host 12 initially executes unreleasable extent access processing according to the unreleasable extent access processing routine RT10 shown in FIG. 26, and executes processing similar to step S91 to step S93 of the unreleasable extent access processing routine RT7 according to the first embodiment (S121 to S123).

Contrarily, when the set LBA is in use (S122: YES), the CPU 211 of the host 12 notifies such LBA to the storage apparatus 11 (S124).

Here, the CPU 211 of the host 12 creates a control command for commanding the notification of the set LBA, and sends this control command to the shared memory unit 102 (control logical volume 22).

The port processor 107 of the storage apparatus 11 refers to the pool management table 134 based on the control command and changes the access flag management column 193 of the extent corresponding to the set LBA to "TRUE", and thereby recognizes that this extent is an unreleasable extent.

Next, the CPU 211 of the host 12 executes processing similar to step S95 to step S96 of the unreleasable extent access processing routine RT7 according to the first embodiment (S125 to S126), and thereafter ends the unreleasable extent access processing routine RT10 shown in FIG. 26 (S127).

Like this, with the storage system 1, when the set LBA is in use, such LBA is notified to the storage apparatus 11 so as to recognize the extent corresponding to the set LBA as an unreleasable extent, and a physical storage extent of the parity group 19 that is not recognized as an unreleasable extent is released from the dynamic logical volume 21. As a result, by notifying the set LBA to the storage apparatus 11 instead of executing the reading of data stored in the physical storage extent corresponding to the LBA, it is possible to release the unnecessary physical storage extent from the dynamic logical volume 21 without having to place a burden on the band of the SAN network upon reading data.

The present invention is applicable to a storage system including a storage apparatus for providing a dynamically capacity-extensible logical volume to a host computer.

What is claimed is:

1. A storage system comprising:
a storage apparatus for providing a dynamic logical volume associated with a physical storage device to a host computer, wherein said host computer having a file system for inputting and outputting data to and from said dynamic logical volume, wherein said storage apparatus comprises:
an allocation unit for allocating a plurality of storage extents in a prescribed unit to said dynamic logical volume associated with said physical storage device when said allocation unit receives said data sent from said host computer and said plurality of storage extents are not allocated in said prescribed unit, wherein said allocation unit determines whether said plurality of storage extents are allocated when said allocation unit receives said data sent from said host computer, and when said plurality of storage extents are allocated in said prescribed unit, said data is stored in said plurality of storage extents,
a management unit for managing at least one first storage extent recognized as being currently used by said file system, from among said plurality of storage extents allocated to said dynamic logical volume by said allocation unit; and
a release unit for releasing at least one second storage extent that is not being managed by said management unit, and that does not store said data,
wherein said host computer comprises a notification unit for notifying at least one of said plurality of storage extents being currently used by said file system to said storage apparatus, wherein said management unit manages said at least one of said plurality of storage extents notified by said notification unit as said at least one first storage extent.

2. The storage system according to claim 1, wherein said host computer commands said storage apparatus to start a extent release processing to be executed by said release unit.

3. The storage system according to claim 2, wherein said storage apparatus sends number of said storage extents released by said release unit.

4. A storage system comprising:
a host computer; a storage apparatus for providing a dynamic logical volume associated with a physical storage device to a host computer, said host computer having a file system for inputting and outputting data to and from said dynamic logical volume; and
a management server for managing said host computer and said storage apparatus, wherein said host computer comprises:
a notification unit for notifying at least one of a plurality of storage extents being currently used by said file system to said storage apparatus;
a capacity utilization acquisition unit for acquiring capacity utilization of said file system,
wherein said storage apparatus comprises:
an allocation unit for allocating said plurality of storage extents in a prescribed unit to said dynamic logical volume associated with said physical storage device when said allocation unit receives said data sent from said host computer and said plurality of storage extents are not allocated in said prescribed unit, wherein said allocation unit determines whether said plurality of storage extents are allocated when said allocation unit receives said data sent from said host computer, and when said plurality of storage extents are allocated, said data is stored in said plurality of storage extents;
a release unit for releasing at least one of said plurality of storage extents other than said at least one of said plurality of storage extents notified by said notification unit of said host computer,
a storage extent quantity acquisition unit for acquiring a number of said plurality of storage extents allocated to said dynamic logical volume associated with said file system, and
wherein said management server comprises:
a release decision unit for deciding said dynamic logical volume to release said at least one of said plurality of storage extents based on said capacity utilization of said file system acquired by said capacity utilization acquisition unit, and said number of said plurality of storage extents allocated to said dynamic logical volume associated with said file system acquired by said storage extent quantity acquisition unit.

5. The storage system according to claim 4, wherein said release decision unit decides said dynamic logical volume to release said storage extent to be said dynamic logical volume having a difference in the capacity utilization based on the capacity utilization of said file system and capacity utilization by the number of said plural storage extents of said dynamic logical volume corresponding to said file system.

6. The storage system according to claim 4, wherein said host computer comprises a command unit for commanding said storage apparatus to start a extent release processing to be executed by said release unit if said release decision unit of said management server decides said dynamic logical volume to release one more of said storage extents.

7. The storage system according to claim 6, wherein said storage apparatus comprises a send unit for sending number of said storage extents released by said release unit.

8. A storage extent release method of a storage system, said storage system including a storage apparatus for providing a dynamic logical volume associated with a physical storage device, and a host computer having a file system for inputting and outputting data to and from said dynamic logical volume, said method comprising:
a first step for determining, by an allocation unit of said storage apparatus, whether a plurality of storage extents are allocated to said dynamic logical volume when said allocation unit receives said data sent from said host computer, and allocating said plurality of storage extents in a prescribed unit to said dynamic logical volume when said allocation unit determines that said plurality of storage extents are not allocated in said prescribed unit, wherein said data is stored in said plurality of storage extents when said allocation unit determines that said plurality of storage extents are allocated in said prescribed unit;
a second step for sending, by notification unit of said host computer, a notification for notifying at least one of said plurality of storage extents being currently used by said file system, to said storage apparatus;
a third step for receiving, by a management unit of said storage apparatus, said notification from said host computer;
a fourth step for managing, by said management unit, said at least one of said plurality of storage extents notified by said notification unit as being currently used by said file system; and
a fifth step for releasing, by a release unit of said storage apparatus, said at least one of said plurality of storage extents that is not being managed by said management unit, and that does not store said data.

9. The storage extent release method according to claim 8, wherein said release unit receives a command for commanding to start a extent release processing at said fifth step.

10. The storage extent release method according to claim 9, further comprising a sixth step for sending, by said release unit, a number of said at least one of said plurality of storage extents released at said fifth step to said host computer.

* * * * *